(12) United States Patent
Bereziy et al.

(10) Patent No.: US 11,148,278 B2
(45) Date of Patent: Oct. 19, 2021

(54) EXOSKELETON

(71) Applicant: LIMITED LIABILITY COMPANY "EXOATLET", Moscow (RU)

(72) Inventors: Ekaterina Sergeevna Bereziy, Moscow (RU); Elena Valentinovna Pismennaya, Moscow (RU); Andrey Viktorovich Kuzmichev, Moscow (RU); Eduard Kirovich Lavrovskiy, Moscow (RU)

(73) Assignees: LIMITED LIABILITY COMPANY, Moscow (RU); "EXOATLET", Moscow (RU)

( * ) Notice: Subject to any disclaimer, the term of this patent is extended or adjusted under 35 U.S.C. 154(b) by 495 days.

(21) Appl. No.: 15/571,946

(22) PCT Filed: Jul. 18, 2016

(86) PCT No.: PCT/RU2016/000448
§ 371 (c)(1),
(2) Date: Nov. 6, 2017

(87) PCT Pub. No.: WO2017/069652
PCT Pub. Date: Apr. 27, 2017

(65) Prior Publication Data
US 2018/0141206 A1    May 24, 2018

(30) Foreign Application Priority Data
Oct. 19, 2015    (RU) .......................... RU2015144703

(51) Int. Cl.
*B25J 9/00* (2006.01)
*A61H 3/00* (2006.01)

(52) U.S. Cl.
CPC .............. *B25J 9/0006* (2013.01); *A61H 3/00* (2013.01); *A61H 3/008* (2013.01);
(Continued)

(58) Field of Classification Search
CPC .... A61H 1/0237; A61H 1/024; A61H 1/0244; A61H 1/0262; A61H 3/00; A61H 3/008;
(Continued)

(56) References Cited

U.S. PATENT DOCUMENTS

| 7,731,670 B2 | 6/2010 | Aguirre-Ollinger et al. |
| 2003/0115031 A1* | 6/2003 | Dariush ................. G16H 50/50 703/11 |

(Continued)

FOREIGN PATENT DOCUMENTS

| EP | 2583657 B1 | 2/2015 |
| RU | 2364385 C2 | 8/2009 |

(Continued)

OTHER PUBLICATIONS

International Search Report with regard to PCT/RU2016/000448 dated Nov. 24, 2016.
(Continued)

*Primary Examiner* — Valerie L Woodward
(74) *Attorney, Agent, or Firm* — BCF LLP

(57) ABSTRACT

A method for setting desired trajectories of movement of an exoskeleton for enabling movement in a user with a musculoskeletal disorder, a device for assisting walking in the user, and a method for controlling said device. Walking in the user can be enabled in predetermined modes of movement. The device has a part worn by the user including a motorized lower limb exoskeleton equipped with a control device, embodied in an on-board controller of the exoskeleton, and a non-worn part which includes an external computer for a specialized assistant and a system for determining the parameters of desired trajectories of movement of the exoskeleton in a Cartesian coordinate system. Control signals for exoskeleton actuators are generated taking into consideration the mass and inertial properties of body seg- (Continued)

ments of the user and of elements of the exoskeleton, as well as requirements regarding the quality of control.

8 Claims, 7 Drawing Sheets

(52) U.S. Cl.
CPC ........... *A61H 2201/1481* (2013.01); *A61H 2201/1602* (2013.01); *A61H 2201/1676* (2013.01); *A61H 2201/5007* (2013.01); *A61H 2201/5069* (2013.01); *A61H 2201/5084* (2013.01); *G05B 2219/40305* (2013.01)

(58) Field of Classification Search
CPC ...... A61H 2003/007; A61H 2201/5069; A61H 2201/5084; B25J 9/0006; G05B 2219/40305
See application file for complete search history.

(56) References Cited

U.S. PATENT DOCUMENTS

| | | | | |
|---|---|---|---|---|
| 2004/0246769 | A1* | 12/2004 | Ido | A61B 5/1038 365/154 |
| 2008/0161937 | A1* | 7/2008 | Sankai | A61H 3/008 623/25 |
| 2015/0025423 | A1 | 1/2015 | Caires et al. | |

FOREIGN PATENT DOCUMENTS

| | | |
|---|---|---|
| WO | 2011/002306 A1 | 1/2011 |
| WO | 2014/113456 A1 | 7/2014 |

OTHER PUBLICATIONS

Voronov et al., "Determination of Mass-Inertia of Human Leg", Human Physiology, 1998, vol. 24, No. 2, pp. 210-220.
Aliseychik et al., "Mechanics and Operation of Lower Limbs Exoskeletons for Neurorehabilitation of Patients With Spinal Cord Injuries", Xle Russian Congress on Fundamental Problems of Theoretical and Applied Mechanics, Kazan, 2015, pp. 133-135 (and English Translation).
Beletskiy, "Biped gait", Model Problems of Dynamics and Control, 1984, p. 16, pp. 219-220 (and English Translation).
Titov et al., "Implementation of Force/Torque Control for 2-DoF Manipulator", Bulletin of NTUU "KPI", Serya Machine-Building, ISSN 2305-9001, 2013, vol. 2, No. 68, pp. 148-156 (and English Abstract and translation of p. 150).
Voronov, "Anatomical structure and biomechanical characteristics of muscles and joints of the lower extremity", M. Fizkultura, Education and Science, 2003, pp. 11-12, 19-20 (and English Translation).
Beletskiy et al., "Model problem of bipedal walking", Mechanics of Solids, Academy of Sciences of the USSR, Moscow, 1981, No. 2, 2 pages (and English Translation).
Winter, "Biomechanics and motor control of human movement", John Wiley & Sons, Inc., 2009, 383 pages, p. 86—Table 4.1.

\* cited by examiner

EXOSKELETON

FIELD OF THE TECHNOLOGY

The invention relates to the medical equipment, in particular to the methods for setting desired trajectories of movement of an exoskeleton, devices for assisting walking in a user and methods to control walking assistance devices in predetermined modes of movement of users with a musculoskeletal disorder, with limited excursion or complete non-motility of the lower limbs at normal functioning of the upper limbs and upper body part. The invention provides possibility of the walking in a user with a musculoskeletal disorder on horizontal and inclined surfaces, as well as stair flights and crossing over obstacles with the walking pattern analogous to the walking pattern of a healthy person, as well as it can be applied for conduction of rehabilitation and recreational procedures.

BACKGROUND OF THE TECHNOLOGY

There is a known method for setting desired trajectories of movement of an exoskeleton for enabling movement in a user with a musculoskeletal disorder, not having the possibility of independent motion due to limited excursion of the lower limbs, wherein control signals to the exoskeleton drives are generated according to the readings of force sensors installed on the clamping elements of motorized exoskeleton to the user legs [U.S. Pat. No. 7,731,670 B2 patent, publ. in 2010].

This method is impossible to be used for users with complete non-motility of lower limbs, for example, for users with paraplegia due to impossibility for them to create muscle force in legs, and for users with limited excursion of lower limbs it is impossible to ensure setting of desired walking pattern analogous to the walking pattern of a person without a musculoskeletal disorder.

The closest to the proposed invention in terms of method for setting desired trajectories of movement of an exoskeleton for motion in sagittal plane for a user with a musculoskeletal disorder is the method to define desired motion trajectory of exoskeleton in the Cartesian coordinate system for motion in sagittal plane in predetermined modes of movement of users with a musculoskeletal disorder using exoskeleton, comprising a housing equipped with clamps for attachment to the user trunk, left and right foot rest, each of which comprises pivotally connected corresponding thigh and shank sections and foot step equipped with corresponding clamps for attachment to the legs of the user and configured to rotate in sagittal plane, wherein upper ends of the corresponding thigh sections are pivotally connected with the left and, respectively, right end of the exoskeleton housing, wherein hip and knee pivot joints are equipped with sensors of relative angle rotation of adjacent sections and are configured motorized, as well as on-board controller connected to the sensors of relative angle rotation of adjacent sections and control inputs of motorized joints drives, wherein according to this method using motion capture system, comprising serially connected measuring devices unit to collect and transfer the captured motion parameters data, captured motion parameters data processing unit and captured motion parameters storage unit the output of which is connected to the output of motion capture system, ensure measuring of Cartesian coordinates of pre-selected human body points in the process of motion [A. P. Aliseychik, I. A. Orlov, V. E. Pavlovskiy, V. V. Pavlovskiy, A. K. Platonov, Mechanics and control of exoskeletons for lower limbs for neurorehabilitation of spinal patients. —"XI All-Russian convention on fundamental problems of theoretical and applied mechanics" CD-ROM, Kazan, Aug. 20-24, 2015, p. 133-135].

In this method the user's motion manner is formed as a set of time functions of the exoskeleton intersection angles, which does not allow changing the motion parameters—stride length, step height and pace.

The technical result, for achievement of which the proposed method is intended, is the calculation of time-dependent parameters of the desired motion trajectory, allowing to exactly define the desired motion trajectory of the exoskeleton in sagittal plane Cartesian coordinates system for the motion of user with a musculoskeletal disorder with motion manner close to the motion manner of a person without a musculoskeletal disorder, as well as change the step parameters (stride length, step height and pace).

There is a known walking assistance device for a user with a musculoskeletal disorder in predetermined modes of movement comprising exoskeleton equipped with one or several executive mechanisms connected with various sections of the exoskeleton connected to the corresponding body parts of the user, wherein the device provides: receiving of input data indicating the desired sequence motion; obtaining of programmed data movements providing execution of one or more sequential instructions required for performance of relative movements of executive mechanisms for execution of the above instructions and movement of one or more sections of the exoskeleton according to the relative movements of the drive for each instruction [application PCT WO 2011002306 A1, publ. 2011].

In this device, the input signal, which is sent to the drives and defines the motion of the exoskeleton, is step-staired, thus affecting the smoothness of walking in the exoskeleton and does not allow to form control inputs to the exoskeleton drives, which provide close to natural walking pattern, therefore, having a negative impact on the ergonomic characteristics of the walking assistance device for a user with a musculoskeletal disorder.

The closest to this invention in terms of device is the walking assistance device for a user with a musculoskeletal disorder in predetermined modes of movement comprising exoskeleton of lower limbs, wherein exoskeleton includes pelvic section, left and right foot rest, each of which consists of thigh and shank sections and foot steps, wherein adjacent sections are connected using corresponding pivot joints providing the possibility of their rotation in sagittal plane and equipped with sensors of relative angle rotation integrated in the current angles and angular velocity measurement unit, wherein hip and knee pivot joints are configured motorized and equipped with corresponding drives, for example, electric drives, as well as on-board controller connected with sensors of relative angle rotation of adjacent sections and control inputs of motorized joints drives, wherein foot steps are equipped with foot rest reaction sensors integrated in the foot rest reaction measurement unit and mounted in the heel and toe-cap of the foot step, additionally, walking assistance device comprises left and right hand rests and control device comprising desired exoskeleton angles and angular velocity calculation unit, external moment evaluation unit and unit of calculation and generation of control signals to the exoskeleton drives connected to the control inputs of corresponding drives, wherein the input of desired exoskeleton angles and angular velocity calculation unit is connected to the first input of the control device, the third input of which is connected to the output of the current angles and angular velocity measurement unit [RU 2364385 patent, publ. in 2009].

SUMMARY OF THE TECHNOLOGY

This device has the following disadvantages:
the drive signals to the exoskeleton drives are the signals of electromyographic sensors taken off the unaffected extremity, therefore this device and its control method cannot be used by users with no muscular activity (complete paresis), comprising paraplegics;
signals from these sensors do not provide proportionality in terms of angles in pivots;
the input signal, which is sent to the drives and defines the motion of the exoskeleton, is stair-stepped, thus affecting the smoothness of walk in the exoskeleton;
when generating the control signal to the exoskeleton drives, the influence of the user muscle tiredness on the value of the myographic signal is not taken into account, thus affecting the accuracy of the exoskeleton motion;
mathematical model of the user exoskeleton put on used in the control signals generation unit when generating signals to the exoskeleton drives does not take into account the influence of the moment created due to the oscillations of the user trunk, the weight of which is approximately half of the body weight.

The above factors restrict functional capabilities of the device and do not allow to form control impact on the exoskeleton drives which provide walking pattern close to natural, having a negative impact on the ergonomic characteristics of the walking assistance device for a user with a musculoskeletal disorder.

The closest to this invention in terms of control method of this walking assistance device is control method of the walking assistance device for a user with a musculoskeletal disorder in predetermined modes of movement comprising exoskeleton of lower limbs, comprising pelvic section, left and right foot rest, each of which consists of thigh and shank sections and foot steps, wherein adjacent sections are connected using corresponding pivot joints providing the possibility of their rotation in sagittal plane and equipped with sensors of relative angle rotation integrated in the current angles and angular velocity measurement unit, wherein hip and knee pivot joints are configured motorized and equipped with corresponding drives, for example, electric drives, as well as on-board controller connected with sensors of relative angle rotation of adjacent sections and control inputs of motorized joints drives, wherein foot steps are equipped with foot rest reaction sensors integrated in the foot rest reaction measurement unit and mounted in the heel and toe-cap of the foot step, additionally, walking assistance device comprises left and right hand rests and control device comprising desired exoskeleton angles and angular velocity calculation unit, external moment evaluation unit and unit of calculation and generation of control signals to the exoskeleton drives connected to the control inputs of corresponding drives, wherein the input of desired exoskeleton angles and angular velocity calculation unit is connected to the first input of the control device, the third input of which is connected to the output of the current angles and angular velocity measurement unit, wherein according to this method the current angles and angular velocities in hip and knee joints and foot rest reaction forces are measured [RU 2364385 patent, publ. in 2009].

This method used for control of the above walking assistance device for a user with a musculoskeletal disorder determines the restriction of functional capabilities and does not allow the provision of high ergonomic characteristics of the device as it is impossible to be applied for rendering of assistance to walking of users with complete loss musculoskeletal disorder, and when used by users with partial loss of the above functions it can not provide the user with walking pattern close to natural.

Claimed Technical Results as Per Device and Method 2

The technical result, for achievement of which this invention is intended in terms of the walking assistance device for a user with a musculoskeletal disorder and method for control of this device, is the enhancement of functional capabilities and improvement of ergonomic characteristics of the device through provision of possibility to control the correct (close to the walking pattern of a person without a musculoskeletal disorder) walking pattern for users with complete or partial loss of motion activity of muscles and setting, possibility of setting and change, using remote control during motion along the desired trajectories, of such step parameters as stride length, step height and pace, as well as increase of the exoskeleton motion precision on this trajectories.

Other technical results, for achievement of which this invention is intended in terms of the device implementation are:
provision of possibility of the device use for assistance to the walking both with complete and partial paraplegia;
provision of possibility of restoration of correct walking pattern of the user with possibility of choice of various walking parameters (stride length, step height and pace) for provision of possibility of various operation modes of the device—motion on flat, inclined, stepped surfaces, as well as crossing over obstacles, walking on the spot
provision of possibility of smooth, smooth motion along the desired trajectories of hip and ankle pivots defined in the Cartesian coordinates.

For achievement of the above technical result in terms of the method to define the desired trajectories of the exoskeleton motion for movement in sagittal plane of user with a musculoskeletal disorder, according to which using motion capture system comprising serially connected measuring devices unit to collect and transfer the captured motion parameters data, captured motion parameters data processing unit and captured motion parameters storage unit, the output of which is connected to the output of motion capture system, ensure measuring of Cartesian coordinates of pre-selected human body points in the process of its motion, a person without a musculoskeletal disorder is used to measure the Cartesian coordinates of the pre-selected body points, and the points of intersection between the hip joint axis and ankle joints axes, lying in the frontal plane, with sagittal plane are used as the pre-selected body points, the Cartesian coordinates of which are measured. Wherein the above Cartesian coordinates are measured depending on time in the form of trajectories along the axes of the Cartesian coordinates system of the above sagittal plane during motion of the above person for each of the predetermined in advance motion mode, and saved in the captured motion parameters storage unit in the form of data arrays for each measured trajectory, wherein axis of ordinates of the above coordinates system of the sagittal plane is directed vertically, while axis of abscissas—along the course of exoskeleton motion, and further in the unit of captured motion parameters processing, input of which is connected to the output of the motion capture system, captured motion parameters processing is conducted, calculating, based on the above, being table set functions, data arrays of the Cartesian coordinates, the parameters and/or interpolation coefficients for each of the chosen in advance differentiable, interpolating the above trajectories, analytical functions, differentiated at least two times, for example, splines, comprising cubic splines, wherein the calculated parameters and/or interpolation coefficients are saved in the connected to the output of the unit of captured motion parameters processing storage unit of parameters and/or interpolation coefficients.

Wherein as the pre-determined in advance motion modes of a person without a musculoskeletal disorder are used the modes: "Walking on horizontal surface", "Climbing a stair", "Descending a stair", "Walking up the inclined surface", "Walking down the inclined surface", "Crossing over an obstacle", "Sitting on a rest", "Standing vertically with straightened legs", "Standing up vertically with straightened legs from the stance "Sitting on a rest" position", "Sitting down on a rest from the stance "Standing vertically with straightened legs"".

For achievement of the above technical results in terms of known walking assistance device for a user with a musculoskeletal disorder comprising exoskeleton of the lower limbs, comprising pelvic section and left and right foot rests each of which consists of thigh and shank sections and foot steps. Wherein the adjacent sections are connected using corresponding pivot joints ensuring the possibility of their rotation in sagittal plane and equipped with the corresponding sensors of relative angle rotation integrated in the current angles and angular velocity measurement unit, wherein hip and knee pivot joints are configured motorized and equipped with corresponding drives, for example, electric drives, as well as on-board controller connected to the sensors of relative angle rotation of the adjacent sections and control inputs of the motorized joints drives. Wherein the foot steps are equipped with foot rest reaction sensors integrated in the foot rest reaction unit and mounted in the heel and toe-cap of the foot steps, additionally, the walking assistance device comprises left and right hand rests and control device comprising desired exoskeleton angles and angular velocity calculation unit, external moment evaluation unit and of calculation and generation of control signals to the exoskeleton drives, wherein the input of desired exoskeleton angles and angular velocity calculation unit is connected to the first input of the control device, the third input of which is connected to the output of the current angles and angular velocity measurement unit, it is supplemented with external computer of assistant-specialist configured with provision to assistant-specialist of possibility to input into the exoskeleton on-board controller the ratio of shank length to thigh length, shank length and mass and inertial properties of the user body segments with exoskeleton sections attached to them, motion mode selection and adjustment of such motion parameters as stride length, step height and pace, control panel configured with provision to the user of the possibility of motion mode selection and adjustment of such motion parameters as stride length, step height and pace, unit of current measurement in electric drives comprising first, second, third, fourth current sensors of, respectively, first, second, third, fourth electric drives, unit of desired trajectories generation in the Cartesian coordinates system configured to input to it and store in it the time-dependent parameters and/or interpolation coefficients of the desired motion trajectories in the Cartesian coordinates system for pre-determined in advance motion modes, the first input of which is connected to the first output of control device, while the second input—to the output of the foot rest reaction measurement unit, the first output—is connected to the first input of the control device, and the second output is configured to be connected to the input of the desired motion trajectories parameters determination system in the Cartesian coordinates system, the output of which is configured to be connected to the third input of the unit of desired trajectories generation in the Cartesian coordinates system, the fourth input of which is configured to be connected to the output of the external computer of the assistant-specialist, wherein the control device is supplemented with the unit of desired motion acceleration generation along the trajectories in the Cartesian coordinates system, the first input of which is connected to the first input of the control device, the desired angular acceleration calculator, the first input of which is connected to the output of the unit of desired acceleration generation of motion along the trajectories, and the second input—to the output of unit of the desired angles and angular velocities generation, unit of calculation of angular acceleration to the exoskeleton drives, wherein the first input of the unit of calculation of angular acceleration to the exoskeleton drives is connected to the output of the unit of desired angular acceleration calculation, and the second input—to the output of the unit of desired angles and angular velocity calculation unit, unit of calculation of the exoskeleton current Cartesian coordinates vector, the input of which is connected to the third input of the control device, and the output—to the second input of unit of desired acceleration generation of motion along the trajectories in the Cartesian coordinates system, housing angular motion evaluation unit, the input of which is connected to the output of the unit of calculation of the exoskeleton current Cartesian coordinates, and the output—to the fourth input of the external moment evaluation unit, the fifth input of which is connected through the second input of the control device to the output of the foot rest reaction calculation unit, wherein the first input of the control signals generation unit is connected to the output of the external moment evaluation unit, the first input of which is connected to the output of the unit of calculation of angular acceleration to the exoskeleton drives, and the second input—to the third input of the control device also connected with the third input of the exoskeleton drives angular acceleration calculation unit and to the second input of the control signal generation unit, the third input of which is connected to the output of the exoskeleton drives angular acceleration calculation unit, the fourth input—to the fourth input of the control device also connected with the third input of external moment evaluation unit, and the output to the output of the control device connected to control inputs of the drives equipped with current sensors of the electric drives of the motor current measurement unit, wherein the fourth input of the control device is connected to the output of the electric motors current measurement unit.

For achievement of the above technical results in terms of the control method of the walking assistance device for a user with a musculoskeletal disorder in predetermined modes of movement on the basis of the exoskeleton in the known control method of the walking assistance device for a user comprising the exoskeleton of the lower limbs comprising pelvic section, left and right foot rests each of which consists of thigh and shank sections and foot steps, wherein the adjacent sections are connected using corresponding pivot joints providing the possibility of their rotation in sagittal plane and equipped with corresponding sensors of relative angle rotation integrated in the current angles and angular velocities measurement unit, wherein hip and knee pivot joints are configured motorized and equipped with corresponding drives, for example, electric drives, as well as on-board controller connected with sensors of relative angle rotation of adjacent sections and control inputs of the motorized joints drives, wherein the foot steps are equipped with foot rest reaction sensors integrated in the foot rest reaction measurement unit and mounted in the heel and toe-cap of the foot step, additionally walking assistance device comprises left and right hand rests and control device comprising desired exoskeleton angles and angular velocity calculation unit, external moment evaluation unit and unit of calculation and generation of control signals to the exoskeleton drives connected to control inputs of corresponding drives, wherein the input of desired exoskeleton angles and angular velocity measurement unit is connected to the first input of the control device, the third input of which is connected to the output of current angles and angular velocity measurement unit. Wherein, according to this method, the current angles and angular velocities in hip and knee joints and foot rest reaction forces are measured, the walking assistance device for a user with a musculoskeletal disorder is supplemented with external computer of assistant-specialist, configured with provision to the assistant-specialist of the possibility of input to the on-board controller the ratio of shank length to thigh length, shank length and mass and inertial properties of the user body segments with exoskeleton sections attached to them, selection of the motion mode and adjustment of such motion parameters as stride length, step height and pace, control panel configured with provision to the user of the possibility of selection of the stride length, step height and pace, electric motors current measurement unit comprising the first second, third, fourth current sensors of, respectively, the first, second, third and fourth electric drives, unit of desired trajectories generation in the Cartesian coordinates system configured to input in it and store in it the time-dependent parameters and/or interpolation coefficients of the desired motion trajectories in the Cartesian coordinates system for pre-determined in advance motion modes, the first input of which is connected to the output of the control panel, and the second input—to the output of the foot rest reaction measurement unit, the first output is connected to the first input of the control device, and the second output is configured to be connected to the input of desired motion trajectories parameters determination system in the Cartesian coordinates system, the output of which is configured to be connected to the third input of desired trajectories generation unit in the Cartesian coordinates system, the fourth input of which is configured to be connected to the output of the external computer of the assistant-specialist, wherein the control device is supplemented with a unit of desired motion acceleration generation along the trajectories in the Cartesian coordinates system, the first input of which is connected to the first input of the control device, the desired angular acceleration calculator, the first input of which is connected to the output of the unit of calculation of desired motion acceleration along the trajectories, and the second input—to the output of the unit of the desired angles and angular velocities generation unit, unit of angular acceleration calculation to exoskeleton drives. Wherein the first input of the unit of angular acceleration calculation to the exoskeleton drives is connected to the output of the unit of desired angular acceleration calculation, and the second input—to the unit of desired angles and angular velocities generation, current exoskeleton Cartesian coordinate vector calculation unit, the input of which is connected to the third input of the control device, and the output—to the second input of the unit of desired motion acceleration generation along the trajectories in the Cartesian coordinates system, housing angular motion evaluation unit, the input of which is connected to the output of unit of the exoskeleton current Cartesian coordinate calculation, and the output—to the fourth input of external moment evaluation unit, the fifth input of which is connected through the second input of the control device to the output of the foot rest reaction measurement unit, wherein the first input of the control signals generation unit is connected to the output of the external moment evaluation unit, the first input of which is connected to the unit of angular acceleration calculation to the exoskeleton drives, and the second input—to the third input of the control device, also connected to the third input of the unit of calculation of angular accelerations to the exoskeleton drives and to the second input of the control signals generation unit, the third input of which is connected to the output of the unit of calculation of angular accelerations to the exoskeleton drives, the fourth input—to the fourth input of the control device, also connected with the third input of the external moment evaluation unit, and output—to the output of the control device, connected to the drives control inputs, equipped with current sensors of electric motors of the motors current measurement unit, wherein the fourth input of the control device is connected to the output of the electric motors current measurement unit. Wherein, according to the proposed control method of the walking assistance device for a user with a musculoskeletal disorder, the ratio of shank length to thigh length, shank length are measured and mass and inertial properties of the user body segments measurement is conducted directly or indirectly with exoskeleton sections attached to them and via the external computer of the assistant-specialist and the fourth input of the unit of the desired trajectories generation in the Cartesian coordinate system of the on-board controller are input into the unit of the desired trajectories generation in the Cartesian coordinate system of the on-board controller and through it—into the system of determination of the desired motion trajectories parameters in the Cartesian coordinate system such measured user parameters as shank length, the ratio of shank length to thigh length and mass and inertial properties of the user body segments with exoskeleton put on, and according to the specified ratio of shank length to thigh length of the user data obtaining from the system of desired motion trajectories determination in the Cartesian coordinate system is conducted, which are input in the desired trajectories generation unit in the Cartesian coordinate system in the form of arrays of parameters (coefficients) of interpolation of interpolating functions obtained for a person without a musculoskeletal disorder during his/her movement in each of the pre-determined in advance modes, mode is set using the external computer of the assistant-specialist or control panel from the series of pre-determined in advance modes, numeric values of interpolating functions are calculated and scaled by way of their multiplication by the coefficients equal to the ratio between the shank length of the user with a musculoskeletal disorder and the shank length of a person without a musculoskeletal disorder, desired step parameters are set from control panel or external computer of the assistant-specialist by way of scaling of the interpolating trajectories corresponding to the user represented in the Cartesian coordinate system by corresponding coefficients, as well as for changing of the time of leg carrying over (pace)—by way of scaling of these functions time axis. Wherein, scaling is conducted both for each particular coordinate and for their combinations, in the current exoskeleton Cartesian coordinate vector calculation unit, the vector of the current exoskeleton Cartesian coordinates is calculated, based on the obtained measurements of angles and angular velocities in hip and knee joints, in the unit of desired trajectories generation in the Cartesian coordinates system the desired trajectories of hip and ankle pivots of the exoskeleton depending on time, by way of calculation based on the stored time-dependent parameters (coefficients) values arrays of the numeric values of interpolating functions recorded in the Cartesian coordinate system; the vector of the desired angles and angle velocities is calculated based on the previously calculated values of the vector of the desired trajectories and their first derivatives, in the unit of desired motion acceleration generation along the trajectories in the Cartesian coordinate system the vector of desired acceleration for motion along the trajectory in the Cartesian coordinate system is calculated based on the previously calculated values of the position and velocity vector in the Cartesian coordinate system and the vector of desired trajectories and their first and second derivatives, in the desired angles and angular velocities generation unit the vector of desired angular acceleration is calculated based on the vector of desired acceleration for motion along the trajectory in the Cartesian coordinate system and vector of desired angles and angular velocities, in the desired exoskeleton drives angular acceleration generation the vector of desired angular acceleration to the exoskeleton drives is calculated, based on previously calculated vector of desired angular velocities, vector of desired angles and angular velocities, vector of current angles and angular velocities value in the pivot joints in the external moment evaluation the vector of external moment is calculated based on previously calculated vector of desired angular accelerations to the drives, vectors of current angles and angular acceleration values in pivot joints, vector of foot rest reaction, measured vector of the exoskeleton drives currents and taking into account mass and inertial properties of the user body segments with exoskeleton put on, and the vector of control signals to the drives of exoskeleton is calculated in generated in the unit of control signals generation to the drives of exoskeleton based on previously calculated vector of current angles values, external moment vector and measured vector of current angles and angular velocities values in pivot joints, vectors of the exoskeleton drives currents.

Wherein as the pre-determined in advance motion modes of a person with a musculoskeletal disorder are used the modes: "Walking on horizontal surface", "Climbing a stair", "Descending a stair", "Walking up the inclined surface", "Walking down the inclined surface", "Crossing over an obstacle", "Sitting on a rest", "Standing vertically with straightened legs", "Standing up vertically with straightened legs from the stance "Sitting on a rest" position", "Sitting down on a rest from the stance "Standing vertically with straightened legs".

Wherein the unit of desired motion trajectories generation in the Cartesian coordinate system and control device are implemented in software in the on-board controller of the exoskeleton

BRIEF DESCRIPTION OF THE DRAWINGS

FIG. 5—shows motion trajectories in the Cartesian coordinate system of hip, knee and ankle joints and toes of the transferred legs, and FIG. 6—hip, knee and ankle joints and toes of the support leg.

FIG. 7—shows motion trajectories in the Cartesian coordinates system of the hip and ankle joints of the portable leg for the trajectory with initial step length (shown with dotted line) and trajectory with step length reduced by 30% (shown with full line).

FIG. 8—shows supporting trajectory (full line) of the leg transfer along the leg rise axis and the trajectory of accelerated (dotted line) by 30% leg transfer, FIG. 9—shows supporting trajectory of transfer along the axis of longitudinal leg transfer and trajectory of leg transfer accelerated by 30%.

DETAILED DESCRIPTION OF THE EMBODIMENTS

Figure 1:
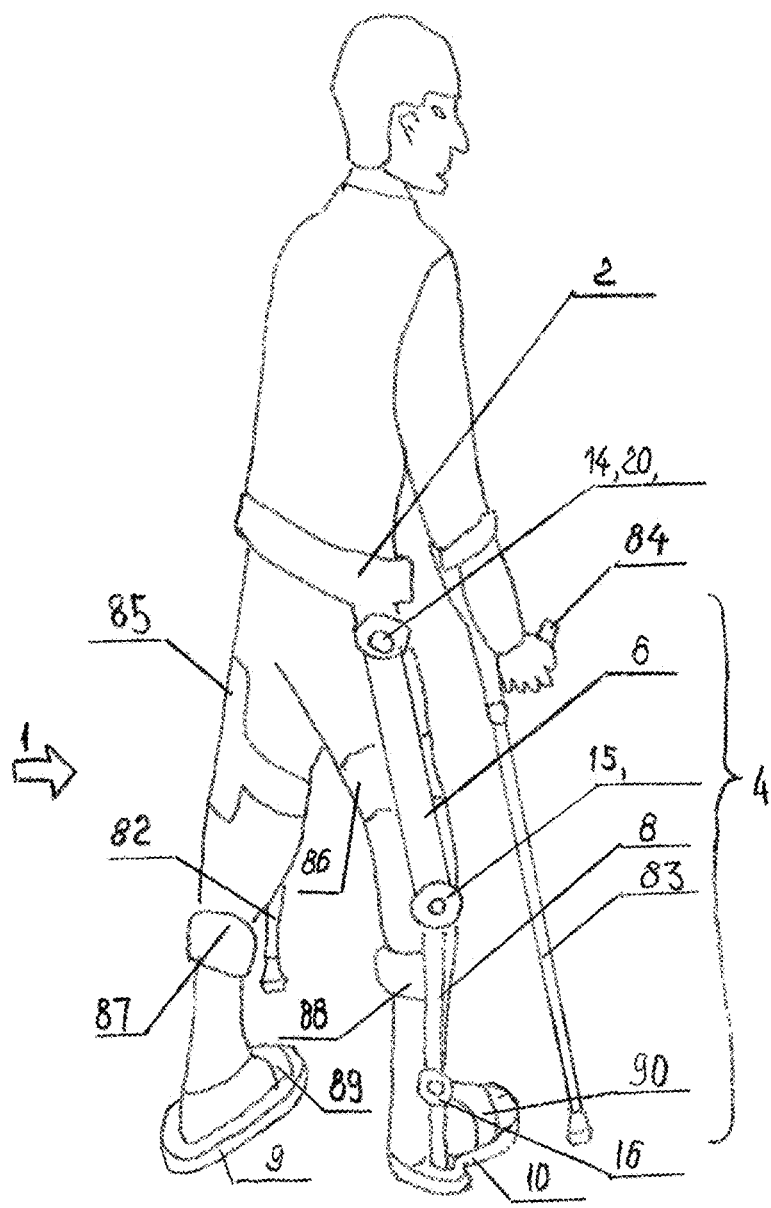
FIG. 1 shows the external appearance of a walking assistance device for a user with a musculoskeletal disorder, FIG. 2—kinematic diagram of this device, FIG. 3—functional diagram of the exoskeleton desired motion trajectories parameters determination system in the Cartesian coordinate system, and FIG. 4—functional diagram of the walking assistance device for a user.
Figure 2:
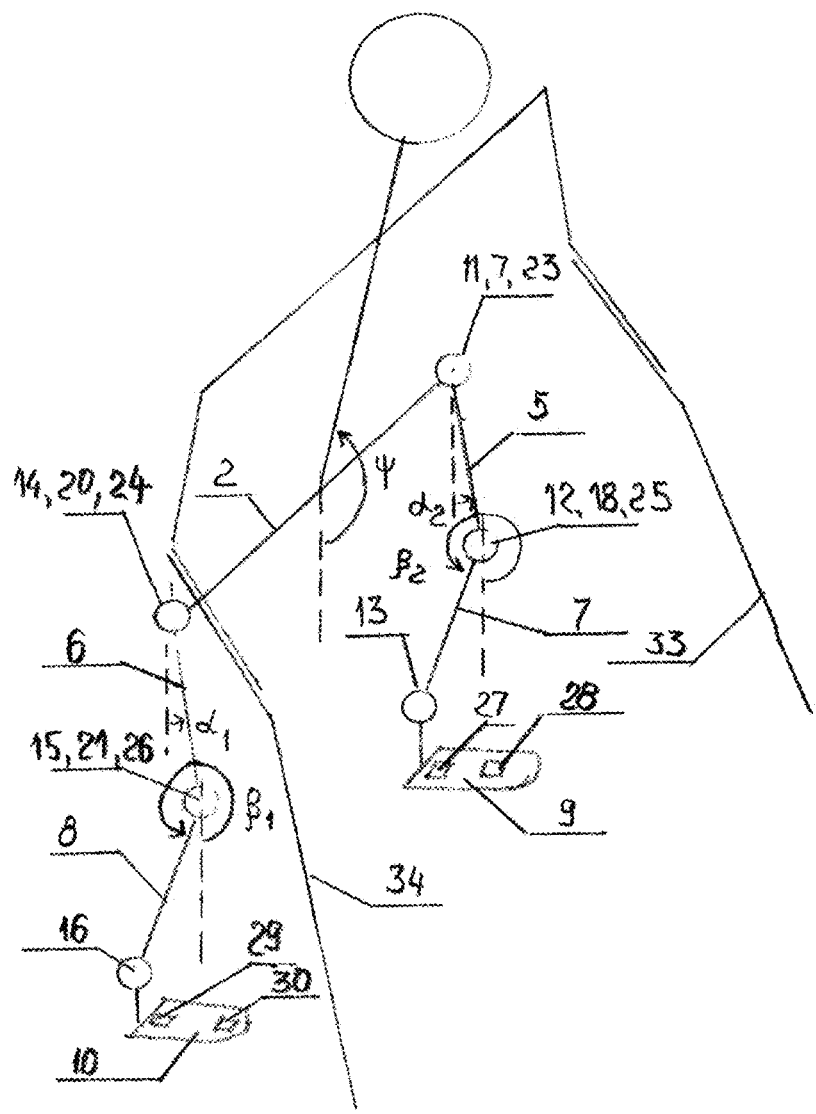
Figure 3:
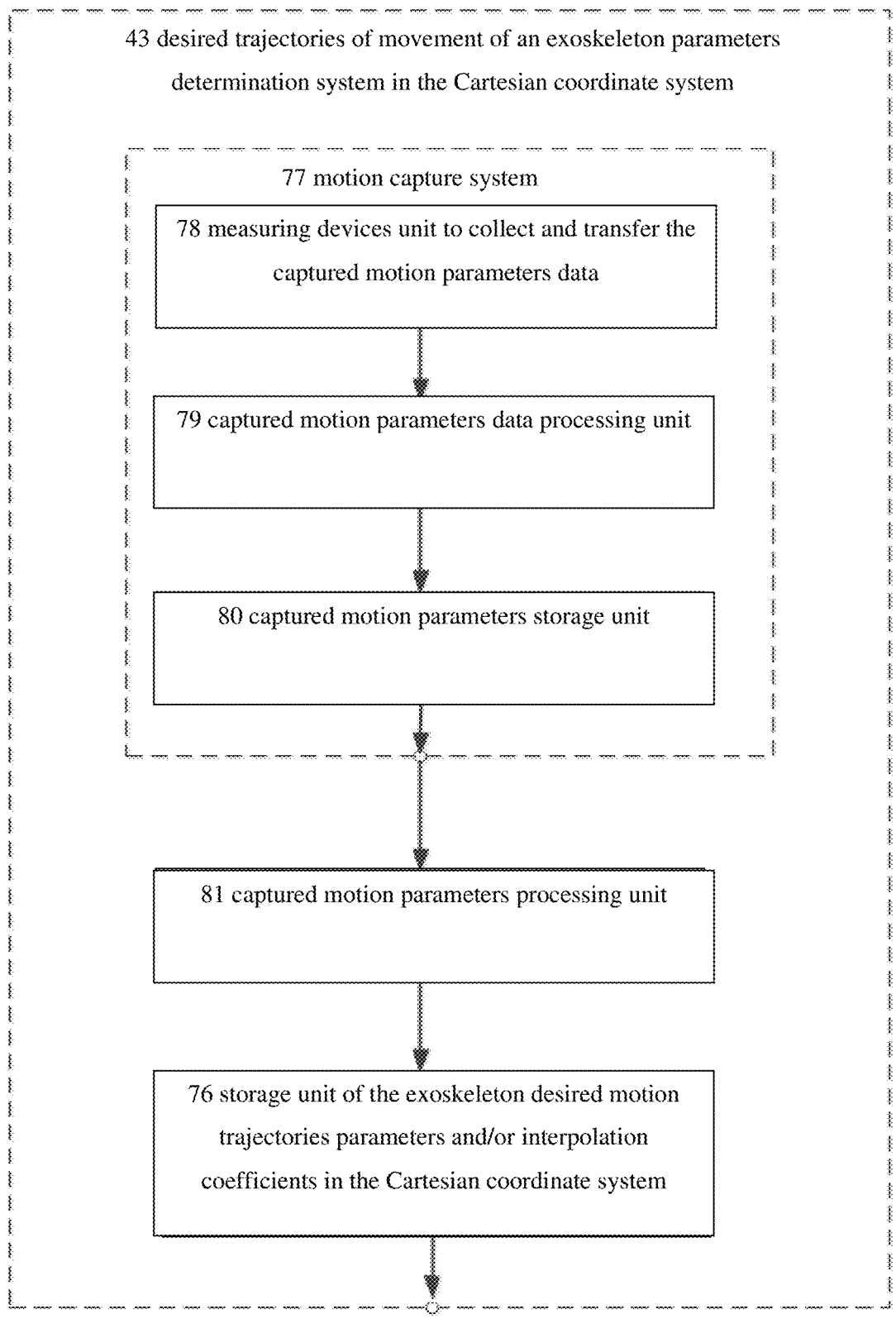
Figure 4:
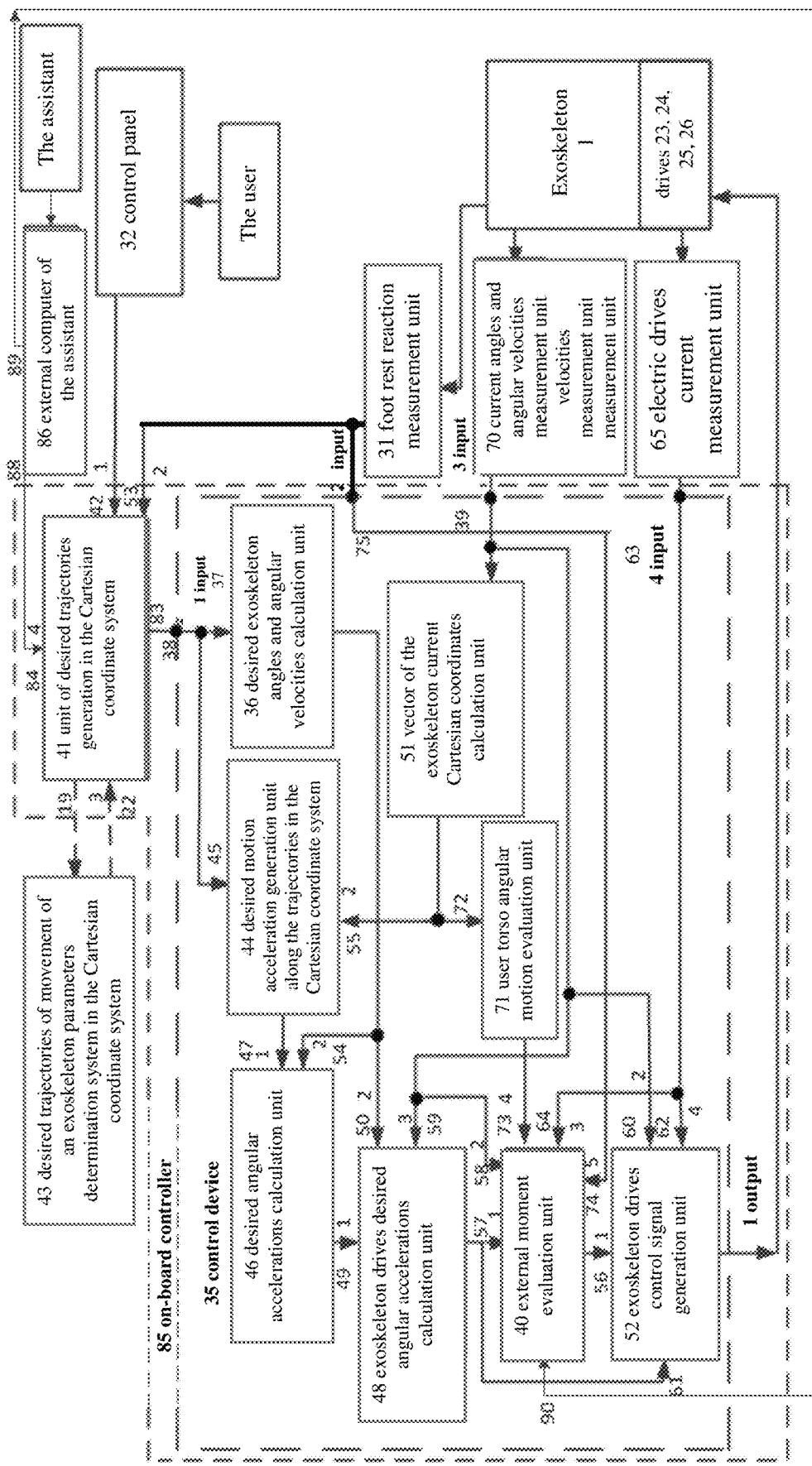
Figure 5:
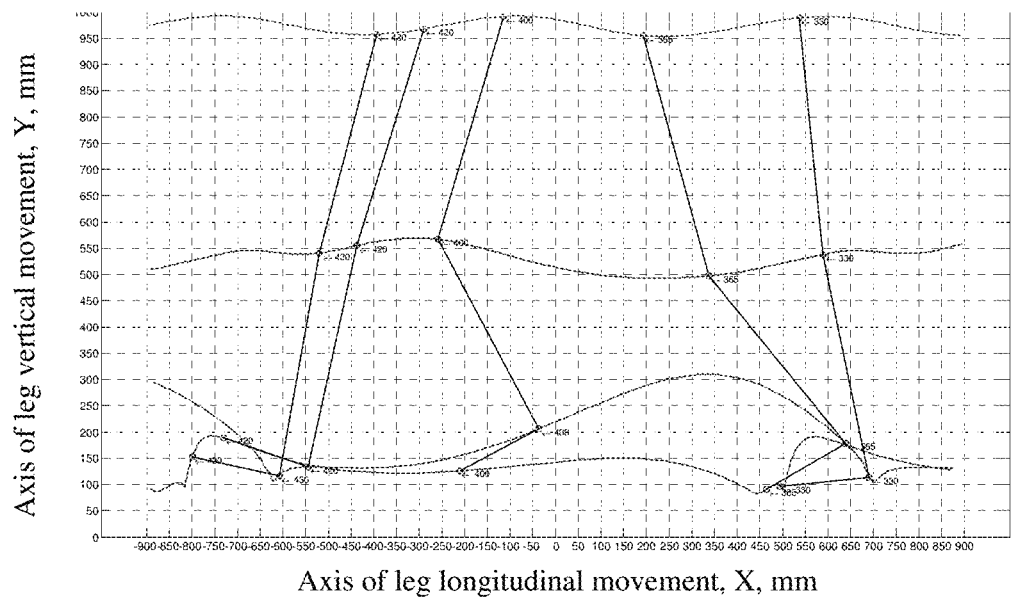
FIG. 5-9 shows motion trajectory in sagittal plane of several points of lower limbs of a person without a musculoskeletal disorder in the Cartesian coordinate system obtained experimentally using Vicon motion video capture system.
Figure 6:
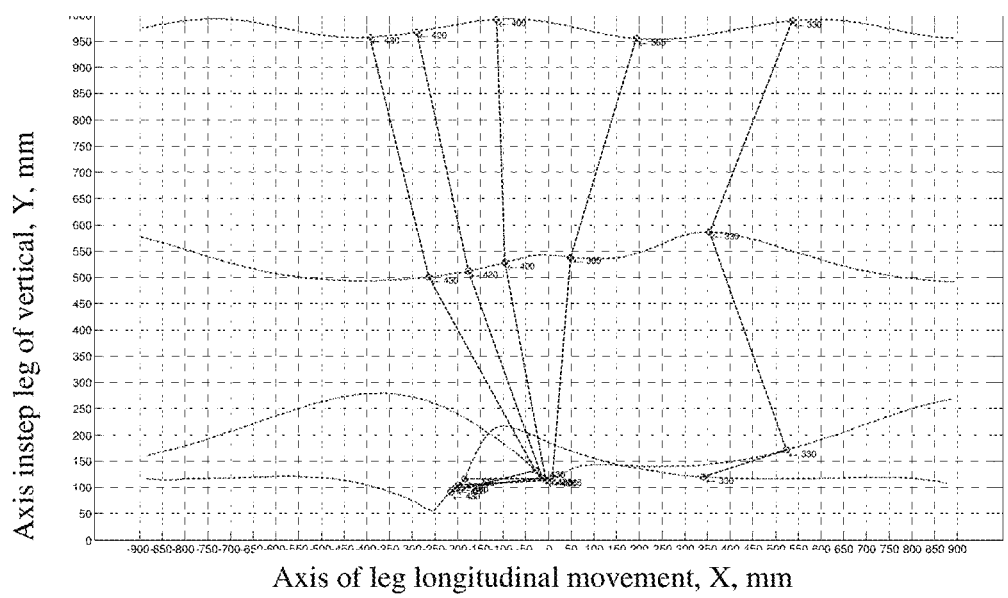

In FIG. 1-9 the following is indicated:
1—exoskeleton of lower limbs;
2—pelvic section;
3 and 4—respectively, left and right foot rests;
5 and 6—respectively, left and right thigh sections;
7 and 8—respectively, left and right shank sections;
9 and 10—respectively, left and right foot steps;
11—left hip pivot joint;
12—left knee pivot joint;
13—left ankle pivot joint;
14—right hip pivot joint;
15—right knee pivot joint;
16—right ankle pivot joint;
17—sensor of relative angle rotation of the left thigh section;
18—sensor of relative angle rotation of the left shank section;
19—second output of the unit 41 of desired trajectories generation in the Cartesian coordinate system;
20—sensor of relative angle rotation of the right thigh section;
21—sensor of relative angle rotation of the right shank section;
22—third output of the unit 41 of desired trajectories generation in the Cartesian coordinate system;
23—drive of the left hip pivot joint;
24—drive of the right hip pivot joint;
25—drive of the left knee pivot joint;
26—drive of the right knee pivot joint;
27, 28, 29 and 30—first, second, third and, respectively, fourth foot rest reaction force sensor;
31—foot rest reaction measurement unit;
32—control panel;
33 and 34—left and, respectively, right hand rests;
35—control device;
36—desired exoskeleton angles and angular velocities calculation unit;
37—desired exoskeleton angles and angular velocities calculation unit 36 input;
38—first input of the control device 35;
39—third input of the control device 35;
40—external moment evaluation unit;

41—unit of desired trajectories generation in the Cartesian coordinate system;
42—first input of the unit 41 of desired trajectories generation in the Cartesian coordinate system;
43—desired motion trajectories parameters determination system in the Cartesian coordinate system;
44—desired motion acceleration generation unit along the trajectories in the Cartesian coordinate system;
45—first input of the desired motion acceleration generation unit 44 along the trajectories in the Cartesian coordinate system;
46—desired angular accelerations calculation unit;
47—first input of the desired angular accelerations calculation unit 46;
48—exoskeleton drives desired angular accelerations calculation unit; 49 and 50—first and, respectively, second inputs of the exoskeleton drives desired angular accelerations calculation unit 48;
51—vector of the exoskeleton current Cartesian coordinates calculation unit;
52—exoskeleton drives control signal generation unit;
53—second input of the unit 41 of desired trajectories generation in the Cartesian coordinate system;
54—second input of the desired angular accelerations calculation unit 46;
55—second input of the desired motion acceleration generation unit 44 along the trajectories in the Cartesian coordinate system;
56—first input of the exoskeleton drives control signal generation unit 52;
57 and 58—first and, respectively, second inputs of external moment evaluation unit 40;
59—third input of the exoskeleton drives desired angular accelerations calculation unit 48;
60, 61, 62—second, third and, respectively, fourth inputs of the exoskeleton drives control signal generation unit 52;
63—fourth input of the control device 35;
64—third input of external moment evaluation unit 40;
65—electric drives current measurement unit;
66, 67, 68 and 69—first, second, third and, respectively, fourth 69 sensors of current of the first 23, second 24, third 25 and, respectively, fourth 26 electric drives;
70—current angles and angular velocities measurement unit;
71—user body angular motion evaluation unit;
72—user body angular motion evaluation unit input;
73—fourth input of external moment evaluation unit 40;
74—fifth input of external moment evaluation unit 40;
75—fifth input of the control device 35;
76—storage unit of the exoskeleton desired motion trajectories parameters and/or interpolation coefficients in the Cartesian coordinate system;
77—motion capture system;
78—measuring devices unit to collect and transfer the captured motion parameters data;
79—captured motion parameters data processing unit;
80—captured motion parameters storage unit;
81—captured motion parameters processing unit;
82—crutch handle;
83—first output of the unit 41 of desired trajectories generation in the Cartesian coordinate system;
84—fourth output of the unit 41 of desired trajectories generation in the Cartesian coordinate system;
85—on-board controller;
86—external computer of the assistant-specialist;
87—desired motion trajectories in the Cartesian coordinate system determination controller;
88 and 89—first and, respectively, second outputs of the external computer 86 of the assistant;
90—sixth input of external moment evaluation unit 40;

Method for setting desired trajectories of movement of an exoskeleton in the Cartesian coordinate system for the movement in sagittal plane in predetermined modes of movement of user with a musculoskeletal disorder is implemented for the exoskeleton 1 comprising pelvic 2 section and left 3 and right 4 foot rests each of which consists of thigh 5 (6) and shank 7 (8) sections and foot steps 9 (10).

Wherein the adjacent sections 2-5, 5-7, 7-9, 2-6, 6-8 and 8-10 are connected using corresponding pivot joints 11, 12, 13, 14, 15 and 16 ensuring the possibility of their rotation in sagittal plane and equipped with the corresponding sensors 17, 18, 20, 21 of relative angle rotation integrated in the current angles and angular velocity measurement unit 70, wherein hip 11 and 14 and knee 12 and 15 pivot joints are configured motorized and equipped with corresponding drives 23, 24 and 25, 26, for example, electric drives, as well as on-board controller 85 connected to the sensors 17, 18, 20, 21 of relative angle rotation of the adjacent sections and control inputs of the motorized joints drives 23, 24 and 25, 26.

Wherein, according to this method, the motion capture system 77, which includes serially connected measuring devices unit 78 to collect and transfer the captured motion parameters data, the captured motion parameters data processing unit 79, the captured motion parameters storage unit 80, the output of which is connected to the output of the motion capture system 77, ensures measuring of Cartesian coordinates of pre-selected human body points in the process of motion, wherein motion capture system 77 is used in the scope of desired trajectories parameters determination system in the Cartesian coordinate system 43, and a person without a musculoskeletal disorder is used to measure the Cartesian coordinates of the pre-selected body points, and the points of intersection between the hip joint axis and ankle joints axes, lying in the frontal plane, with sagittal plane are used as the pre-selected body points, the Cartesian coordinates of which are measured.

Wherein the above Cartesian coordinates are measured depending on time in the form of trajectories along the axes of the Cartesian coordinates system of the above sagittal plane during motion of the above person for each of the pre-determined in advance motion mode, and saved in the captured motion parameters storage unit 80 in the form of data arrays for each measured trajectory, wherein axis of ordinates of the above coordinates system of the sagittal plane is directed vertically, while axis of abscissas—along the course of exoskeleton motion.

Further in the captured motion parameters processing unit 81 integrated into the desired motion trajectories parameters determination system 43 in the Cartesian coordinates system, the input of which is connected to the output of the motion capture system 77, processing of the parameters and/or interpolation coefficients of the captured motion is conducted, calculating, based on the above arrays of table set time functions of the Cartesian coordinates, the parameters and/or interpolation coefficients for each of the chosen in advance differentiable, interpolating the above trajectories, analytical functions, differentiated at least two times, for example, splines, comprising cubic splines.

Wherein the calculated parameters and/or interpolation coefficients are recorded in the storage unit 76 of the exoskeleton desired motion trajectories parameters and/or interpolation coefficients in the Cartesian coordinate system connected to the output of the captured motion parameters processing unit 81 and integrated in the desired motion trajectories parameters determination system 43 in the Cartesian coordinate system.

Wherein the above measurements, processing of data obtained as the result of these measurements and storage of the results of these data processing are conducted for a group of people with various ratio of shank length to thigh length, wherein preserving the data on the above ratios and shank length for each person in this group.

Wherein the captured motion parameters processing unit 81 and storage unit 76 of the exoskeleton desired motion trajectories parameters and/or interpolation coefficients in the Cartesian coordinate system should preferably be implemented in software in the controller 87 of desired motion trajectories system determination in the Cartesian coordinate.

Wherein as the pre-determined in advance motion modes of a person without a musculoskeletal disorder are used the modes: "Walking on horizontal surface", "Climbing a stair", "Descending a stair", "Walking up the inclined surface", "Walking down the inclined surface", "Crossing over an obstacle", "Sitting on a rest", "Standing vertically with straightened legs", "Standing up vertically with straightened legs from the stance "Sitting on a rest" position", "Sitting down on a rest from the stance "Standing vertically with straightened legs"".

Walking assistance device for a user with a musculoskeletal disorder in predetermined modes of movement, comprising exoskeleton 1 of the lower limbs, includes pelvic 2 section and left 3 and right 4 foot rests each of which consists of thigh 5 (6) and shank 7 (8) sections and foot steps 9 (10). Wherein the adjacent sections 2-5, 5-7, 7-9, 2-6, 6-8 and 8-10 are connected using corresponding pivot joints 11, 12, 13, 14, 15 and 16 ensuring the possibility of their rotation in sagittal plane and equipped with the corresponding sensors 17, 18, 20, 21 of relative angle rotation integrated in the current angles and angular velocity measurement unit 70.

Wherein hip 11 and 14 and knee 12 and 15 pivot joints are configured motorized and equipped with corresponding drives 23, 24 and 25, 26, for example, electric drives, as well as on-board controller 85 connected with sensors 17, 18, 20, 21 of relative angle rotation of adjacent sections and control inputs of the motorized joints drives 23, 24 and 25, 26, wherein the foot steps 9 and 10 are equipped with first 27, second 28, third 29 and fourth 30 foot rest reaction sensors integrated in the foot rest reaction measurement unit 31 and mounted in the heel 27, (29) and toe-cap 28, (30) of the foot steps 9 (10).

Additionally, the walking assistance device comprises left 33 and right 34 hand rests and control device 35, comprising exoskeleton 1 desired angles and angular velocities calculation unit 36, external moment evaluation unit 40 and control signals to the exoskeleton 1 drives generation unit 52 connected to the control inputs of the corresponding drives, wherein exoskeleton 1 desired angles and angular velocities calculation unit 36 input 37 is connected to the first input 38 of the control device 35, third input 39 of which is connected to the output of current angles and angular velocities measurement unit 70.

Additionally, walking assistance device for a user with a musculoskeletal disorder comprises external computer 86 of the assistant-specialist configured to provide the assistant-specialist with the possibility of input into the on-board controller 85 of the exoskeleton 1 of the ratio of shank length to thigh length, shank length and mass and inertial properties of the user body segments with exoskeleton sections attached to them, motion mode selection and adjustment of such motion parameters as stride length, step height and pace, control panel 32, configured to provide the user with the possibility of motion mode selection and adjustment of such motion parameters as stride length, step height and pace and electric drives current measurement unit 65, comprising first 66, second 67, third 68, fourth 69 current sensors of, respectively, first 23, second 24, third 25 and fourth 26 electric drives.

Additionally, walking assistance device for a user with a musculoskeletal disorder comprises the desired Cartesian trajectories generation unit 41, configured to input to it and store in it the time-dependent parameters and/or interpolation coefficients of the desired Cartesian trajectories for pre-determined in advance motion modes, the first input 42 of which is connected to the output of control panel 32, and the second input 53—to the output of the foot rest reaction measurement unit 31, first output 83 is connected to the first input 38 of control device 35, and the second output 19 is configured with the possibility to connect to the input of the desired motion Cartesian trajectories parameters determination system 43, the output of which is configured with the possibility to connect to the third input 22 of the desired Cartesian trajectories generation unit 41, the fourth input 84 of which is configured with the possibility to connect to the first 88 output of the external computer 86 of the assistant-specialist, the second output 89 of which is configured with the possibility to connect to the sixth input 90 of the external moment evaluation unit 40.

Wherein the control device 35 comprises the desired motion acceleration generation unit 44 along the trajectories in the Cartesian coordinate system, the first input 45 of which is connected to the first input 38 of the control device 35, desired angular accelerations calculation unit 46, the first input 47 of which is connected to the output of the desired trajectory accelerations generation unit 44, and the second input 54—to the output of desired exoskeleton angles and angular velocities calculation unit 36, unit 48 of calculation of desired angle accelerations to the exoskeleton 1 drives, the first input 49 of which is connected to the output of the desired angular accelerations calculation unit 46, and the second input 50—to the output of the desired exoskeleton angles and angular velocities calculation unit 36, vector of the exoskeleton 1 current Cartesian coordinates calculation unit 51, the input of which is connected to the third input 39 of the control device 35, and the output to the second 55 input of the desired motion accelerations generation unit 44 along the trajectories in the Cartesian coordinate system.

Additionally, the walking assistance device comprises body angular motion evaluation unit 71, the input 72 of which is connected to the output of current exoskeleton Cartesian coordinates vector calculation unit 51, and the output—to the fourth 73 input of the external moment evaluation unit 40, the fifth input 74 of which through the second input 75 of the control device 35 is connected to the output of the foot rest reaction measurement unit 31.

Wherein, the first input 56 of the exoskeleton drives control signal generation unit 52 is connected to the output of the external moment evaluation unit 40, the first input 57 of which is connected to the output of the exoskeleton drives desired angular accelerations calculation unit 48, and the second input 58—to the third input 39 of the control device 35, also connected to the third input 59 of the exoskeleton drives desired angular accelerations calculation unit 48 and to the second 60 input of the exoskeleton drives control signal generation unit 52, the third input 61 of which is connected to the output of the exoskeleton drives desired angular accelerations calculation unit 48, the fourth input 62—to the fourth input 63 of the control device 35, also connected to the third input 64 of the external moment evaluation unit 40, and the output—to the output of the control device 35, connected to the control inputs of the drives 23, 24, 25, 26 equipped with sensors 66, 67, 68, 69 of current of electric motors of the electric motors current measurement unit 65, wherein the fourth 63 input of the control device 35 is connected to the output of electric motors currents measurement unit 65.

Wherein, according to the present method for control of the above walking assistance device for a user with a musculoskeletal disorder, the ratio of shank length to thigh length, shank length and mass and inertial properties of the user body segments with exoskeleton sections attached to them are measured and through external computer 86 of the assistant-specialist and the fourth input 84 of the desired trajectories generation unit 41 in the Cartesian coordinate system of the on-board controller 85 are input into the unit 41 of desired trajectories generation in the Cartesian coordinate system of the on-board controller 85 and through it into the desired motion trajectories parameters determination system 43 in the Cartesian coordinate system such measured user parameters as shank length, the ratio of shank length to thigh length and mass and inertial properties of the user body segments with exoskeleton 1 put on, according to the input user ratio of shank length to thigh length data extract is conducted from the desired motion trajectories parameters determination system 43 in the Cartesian coordinate system, which are entered into the desired trajectories generation unit 41 in the Cartesian coordinate system in the form of parameters (coefficients) arrays of interpolation of interpolating functions obtained for a person without a musculoskeletal disorder during his/her movement in each of the pre-determined in advance modes, from the external computer 86 of the assistant-specialist of control panel 32 the user motion mode is set, numeric values of interpolating functions are calculated and scaled by way of their multiplication by the coefficient equal to the ratio between the shank length of the user with a musculoskeletal disorder and the shank length of a person without a musculoskeletal disorder, desired step parameters are set from control panel or external computer of the assistant-specialist by way of scaling of the interpolating trajectories corresponding to the user represented in the Cartesian coordinate system by corresponding coefficients, as well as for changing of the time of leg carrying over (walking rhythm)—by way of scaling of these functions time axis, wherein, scaling is conducted both for each particular coordinate and for their combinations, the vector of the current exoskeleton Cartesian coordinates is calculated, based on the obtained measurements of angles and angular velocities in hip and knee joints, the desired motion trajectories of hip and ankle pivots of the exoskeleton are generated depending on time, by way of calculation based on the stored and time-dependent parameters (coefficients) values arrays of the numeric values of interpolating functions recorded in the Cartesian coordinate system; the vector of the desired angles and angle velocities is calculated based on the previously calculated values of the vector of the desired trajectories and their first derivatives; the vector of desired accelerations for motion along the trajectory in the Cartesian coordinate system is calculated based on the previously calculated values of the position and velocity vector in the Cartesian coordinate system and the vector of desired trajectories and their first and second derivatives; the vector of desired angular acceleration is calculated based on the vector of desired acceleration for motion along the trajectory in the Cartesian coordinate system and the vector of desired angles and angular velocities; the vector of desired exoskeleton drives angular accelerations is calculated, based on the previously calculated vector of desired angular accelerations, vector of desired angles and angular velocities, vector of current pivot joints angles and angular velocities values; the vector of external moment is calculated based on previously calculated vector of desired angular accelerations to the drives, the vector of current angles and angular acceleration values in pivot joints, the vector of measured exoskeleton drives currents and considering the mass-inertia characteristics of segments of the user body with the exoskeleton put on it, and the vector of the exoskeleton drives control signals is calculated and generated on the basis of previously calculated vector of current pivot joints angles and angular velocities values, vector of exoskeleton drives current and vector of foot rest reaction.

Wherein as the pre-determined in advance motion modes of a person with a musculoskeletal disorder are used the modes: "Walking on horizontal surface", "Climbing a stair", "Descending a stair", "Walking up the inclined surface", "Walking down the inclined surface", "Crossing over an obstacle", "Sitting on a rest", "Standing vertically with straightened legs", "Standing up vertically with straightened legs from the stance "Sitting on a rest" position", "Sitting down on a rest from the stance "Standing vertically with straightened legs".

Wherein the unit 41 of desired motion trajectories generation in the Cartesian coordinate system and control device 35 are implemented in software in the on-board controller 85 of the exoskeleton 1.

Description of the Use Principles of the Walking Assistance Device for a User with a Musculoskeletal Disorder Operation of the walking assistance device for a user with a musculoskeletal disorder can be conventionally characterized by three stages:

preparation, at which data arrays are formed that clearly characterize the walking (walking pattern) in the Cartesian coordinate system of a person without a musculoskeletal disorder for pre-determined in advance motion modes, which is the desired trajectory of motion in the same Cartesian coordinate system of user with a musculoskeletal disorder for the same pre-determined in advance motion modes;

measurements and adjustment stage at which the measurement is conducted of the required geometric and mass and inertial properties of user with a musculoskeletal disorder and input of the measured data is conducted into the exoskeleton on-board controller, as well as exoskeleton motion mode and walking parameters (stride length, step height and pace) are set;

stage of control effects generation to the exoskeleton drives at which calculation of control signals and generation of control signals to the exoskeleton drives are performed.

Preparation Stage

According to the proposed method to define the desired motion trajectories of the exoskeleton for movement in the sagittal plane in pre-determined in advance of user with a musculoskeletal disorder motion capture is conducted of a person without a musculoskeletal disorder (FIG. 5, 6), storage of the captured motion in the Cartesian coordinates is conducted, parameters and/or interpolation coefficients of the desired motion trajectories in the Cartesian coordinate system in sagittal plane in the same pre-determined in advance motion modes of a person without a musculoskeletal disorder are calculated and used. Additionally, this person without a musculoskeletal disorder should have the same ratio of shank length to thigh length as the user with a musculoskeletal disorder. Additionally, their shank length should be recorded.

For implementation of the method to define the desired exoskeleton motion trajectories, the desired exoskeleton motion trajectories parameters determination system 43 in the Cartesian coordinate system is used, comprising the following technical means:

motion capture system 77, comprising serially connected measuring devices unit 78 to collect and transfer the captured motion parameters data, captured motion parameters data processing unit 79 and the captured motion parameters storage unit 80, the output of which is connected to the output of the motion capture system 77 and serially connected captured motion parameters processing unit 81, the input of which is connected to the output of motion capture system 77 and storage unit 76 for the desired exoskeleton motion trajectories parameters and/or interpolation function coefficients, where data on the ratio of shank length to thigh length of a person without a musculoskeletal disorder are also recorded.

Thus, in the unit 76 the accumulation and storage is conducted of the calculated parameters and/or interpolation coefficients of the desired trajectories both for the group of people with various ratios of shank length to thigh length, wherein preserving the data on the above ratios and shank length for each person of this group, and for the trajectories corresponding to various pre-determined in advance motion modes (walking on flat, inclined and stepped surfaces, as well as modes of lowering and standing up from the rest).

It is preferable that the captured motion parameters processing unit 81 and storage unit 76 of the exoskeleton desired motion trajectories parameters and/or interpolation coefficients in the Cartesian coordinate system are implemented in the desired motion trajectories in the Cartesian coordinate system determination controller 87.

Wherein as the pre-determined in advance motion modes of a person without a musculoskeletal disorder are used the modes: "Walking on horizontal surface", "Climbing a stair", "Descending a stair", "Walking up the inclined surface", "Walking down the inclined surface", "Crossing over an obstacle", "Sitting on a rest", "Standing vertically with straightened legs", "Standing up vertically with straightened legs from the stance "Sitting on a rest" position", "Sitting down on a rest from the stance "Standing vertically with straightened legs"".

Measurements and Adjustment Stage

At the stage of measurements and adjustment measurements and input into the exoskeleton on-board controller of the anthropometric and mass-inertial parameters of the user with a musculoskeletal disorder. These measurements are conducted by assistant-specialist who inputs the into the exoskeleton 1 on-board controller 85 using external computer 86.

Thus, according to shank length and shank length/thigh length ratio measured by the assistant-specialist, which through the fourth input 84 of the unit 41 of desired motion trajectories generation in the Cartesian coordinate system, the second output 19 of the above unit 41 and input of the desired motion trajectories parameters determination system 43 in the Cartesian coordinate system are input, and through the output of the above system 43 the extract of arrays of parameters and/or interpolation coefficients of the desired trajectories corresponding to the input ration for all pre-determined in advance person motion mode is conducted.

After that trajectories scaling is conducted, which are presented in the Cartesian coordinate system, by the coefficient of shank length of a person without a musculoskeletal disorder and user with a musculoskeletal disorder, and interpolation coefficients of the desired trajectories for the user are calculated. Obtained coefficients clearly determine the desired trajectory of the exoskeleton movement in sagittal plane for movement in predetermined modes of movement of user with a musculoskeletal disorder, and further it is used as the reference in the process of the exoskeleton motion.

Figure 7:
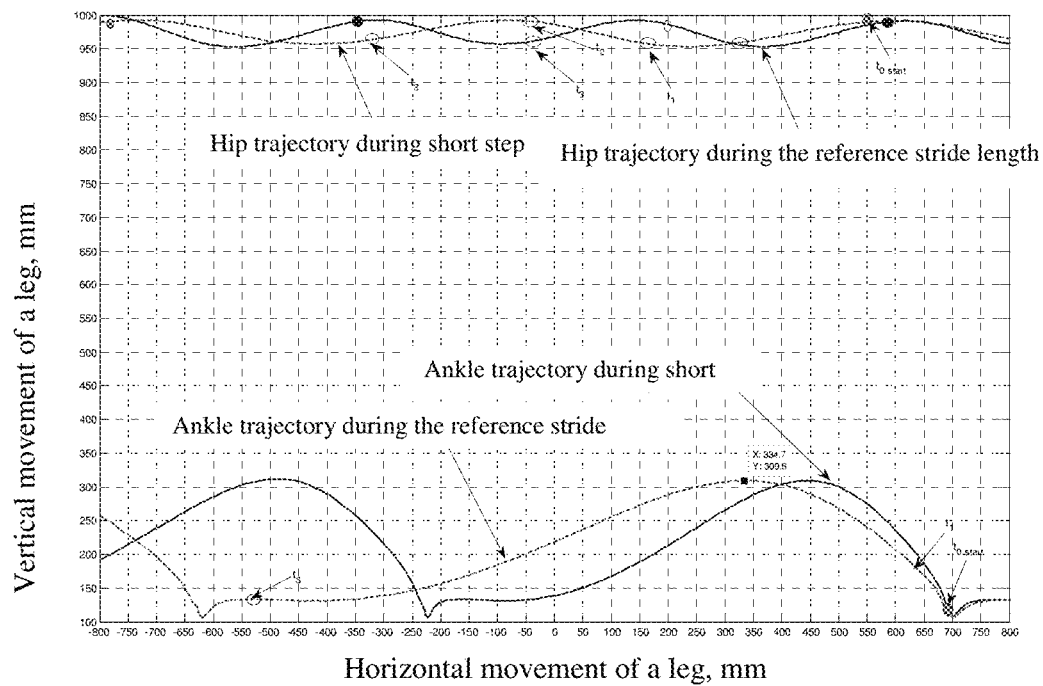
Figure 8:
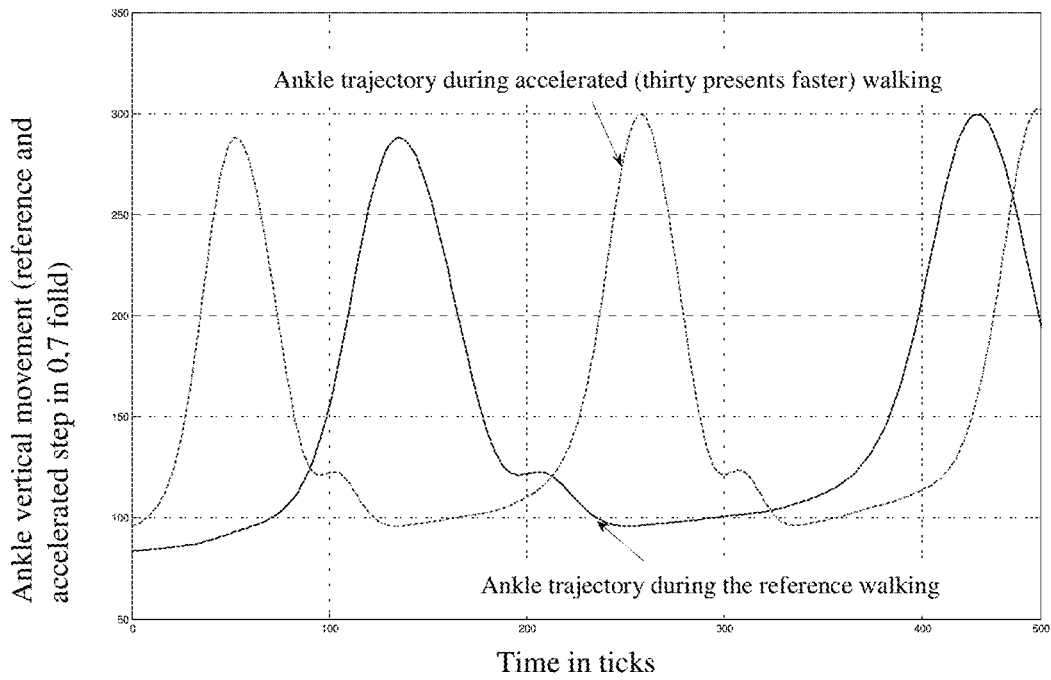
Figure 9:
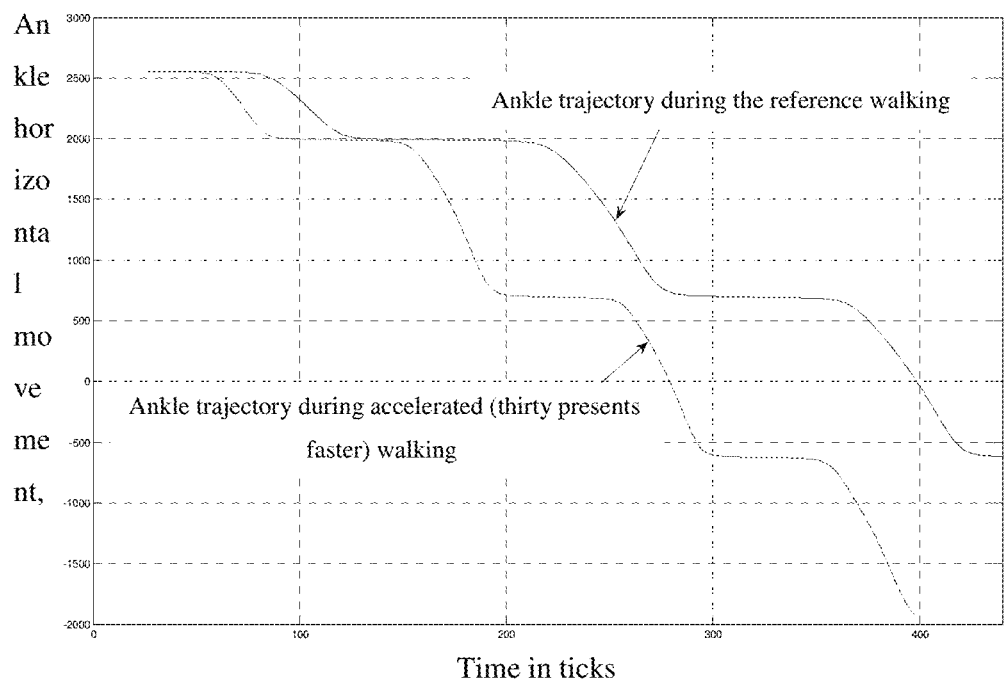

After setting of the walking parameters (step length, leg rise height, walking rhythm) scaling is conducted of the interpolated trajectories corresponding to the user, presented in the Cartesian coordinate system, by the corresponding coefficients, all for changing of time of leg transfer (pace)— by way of scaling of the time axis of these functions, wherein scaling is conducted both for each particular coordinate and their combination. Reference and scaled trajectories are shown in FIGS. 7-9.

Stage of Control Effects Generation to the Exoskeleton Drives

From literature sources [V. V. Beletskiy. Biped walking. Model tasks of dynamics and control. Moscow: Nauka, 1984. 268 pages. Pages 219-220] it is known that dynamic model of exoskeleton with integrated and attached to it lower body part of the user during motion in sagittal plane can be described by the equations taking into account the user trunk motion, $$D(\theta)\ddot{\theta}+H(\theta,\dot{\theta})+G(\theta)+R(\theta)=W(\tau_e+\tau_h) \qquad (1)$$

where D—[7×7] matrix describing the inertia of exoskeleton with a person integrated in it, H—[7×1] vector of Coriolis and centrifugal forces, G—[7×1] vector of gravity forces, R(θ)—[7×1] vector of foot rest reaction of the support leg, W—[7×4]—a certain matrix, $\tau_e$—[4×1] vector of control moments produced by the drives, $\tau_h$—[6×1] vector of external impact moments, θ, $\dot{\theta}$, $\ddot{\theta}$—[7×1] vectors of generalized coordinates, velocities and accelerations. Vector θ[7×1] consists of Cartesian coordinates of hip joint $x_{pel}$, $y_{pel}$, body inclination angle ψ and vector of intersection angles $\vartheta$ (t) =[$\alpha_1(t),\beta_1(t),\alpha_2(t),\beta_2(t)$]' in hip 11 and 14 and knee 12 and 15 pivot joints of support and transferred legs.

Using control panel 32 the required motion mode is selected from the series of pre-determined in advance motion modes. Using integrated in the current angles and angular velocities measurement unit 70 sensors 17, 20 and 18, 21 of relative angle rotation angles and angular velocities of hip 11 and 14 and knee 12 and 15 pivot joints are measured, and using integrated in the electric motors current measurement unit 65 sensors 66, 67, 68 and 69 of electric motors current measurement—electric drives electric motors 23, 24, 25, 26, respectively.

Simultaneously, using force sensors 27, 28, 29 and 30, integrated in the foot rest reaction measurement unit 31, data on the foot rest reaction in foot steps 9 and 10 are collected.

Additionally, on signal from control panel 32 from the storage unit 76 of the parameters and/or interpolation coefficients desired motion trajectories parameters determination system 43 to the memory of the unit 41 of desired trajectories generation in the Cartesian coordinate system parameters and/or interpolation coefficients are entered of motion trajectories of pre-determined in advance motion modes of a person without a musculoskeletal disorder with the same ratio of shank length to thigh length as the user with impairment of the above functions and the shank length of a person without impairment of above functions.

Assistance device requires adjustment to the anthropometric parameters of specific user—ratio of shank length/thigh length and shank length, as well as his/her mass-dimensional parameters. Assistant inputs these user parameters into the unit 41 using external computer 86 of the assistant-specialist. Then, unit 41 receives from unit 43 a set of desired motion trajectories for various motion modes corresponding to the input user anthropometric parameters.

Motion start of the exoskeleton and step parameters are set by the assistant using external 86 computer and/or by user using control panel 32.

In the current exoskeleton Cartesian coordinates vector calculation unit 51, the vectors of current exoskeleton Cartesian coordinates are calculated, based on the obtained measurements of angles and angular velocities in hip 11 and 14 and knee 12 and 15 pivot joints, Relations between two ankle pivots and pelvic pivot for the case of single-support walking are of the form of [V. V. Beletskiy. Biped walking. Model tasks of dynamics and control. Moscow: Nauka, 1984. 268 pages. Page 16]

$$Y = \Phi(\vartheta) \quad (2)$$

$$\dot{Y} = \frac{d}{dt}\Phi(\vartheta) \quad (3)$$

where vector $Y=[x_{pel},y_{pel},x_{1a},y_{1a},x_{2a},y_{2a}]'$ which is considered as a time function.

In the unit 41, the desired trajectories of exoskeleton hip and ankle pivots motion are generated depending on time by way of calculation, based on stored and time-dependent parameters (coefficients) values array of numeric values of interpolating functions $\Xi(t)$ and their first $\dot{\Xi}(t)$ and second $\ddot{\Xi}(t)$ derivatives recorded in the Cartesian coordinate system.

The desired angles and angular velocities generation unit 36 calculates the vector of desired angles and angular velocities based on previously calculated values of the vector of desired trajectories and their first derivatives, Relations, assume the availability of inverse ratios [V. V. Beletskiy. Biped walking.—Moscow. Nauka, 1984, -286 pages. Page 16]

$$\vartheta(t) = \Phi^{-1}(Y), \quad (4)$$

$$\dot{\vartheta}(t) = \frac{d\Phi^{-1}(Y)}{dt} \quad (5)$$

Use of vectors $\Xi(t)$, $\dot{\Xi}(t)$, along with ratios, allows calculation of the desired angles $\vartheta^*(t)$ and their first derivatives $\dot{\vartheta}^*(t)$ according to formulas $$\vartheta^*(t) = \Phi^{-1}(\Xi), \quad (6)$$

$$\dot{\vartheta}^*(t) = \frac{d}{dt}\Phi^{-1}(\Xi) \quad (7)$$

In the unit 44 for generation of the desired accelerations for motion along the trajectory, the vector of desired accelerations for motion along the trajectory in the Cartesian coordinates system is calculated based on previously calculated values of the vector of position and velocity in the Cartesian coordinate system and the vector of desired trajectories and their first and second derivatives, Stability of the exoskeleton motion along the trajectories is achieved through control forming in such a manner that deviation S of the exoskeleton coordinates from the desired trajectory is a decreasing time function asymptotically tending to zero (for example, in the form of $$\varepsilon = Y - \Xi(t) = A_1 e^{\lambda_1 t} + A_2 e^{\lambda_2 t}, \lambda_1, \lambda_2 < 0).$$

Determining the vector from it Y after double differentiation we obtain the second derivative $$\ddot{Y}^*(t)=(\lambda_1+\lambda_2)(\dot{Y}(t)-\dot{\Xi}(t))-\lambda_1\lambda_2(Y(t)-\Xi(t))+\ddot{\Xi}(t), \quad (8)$$

ensuring smooth motion along the trajectories in hip and ankle pivots. Vector values $\lambda_1$, $\lambda_2$ are set in the form of negative real numbers and are set-up coefficients and adjusting parameters determined by dynamic characteristics of the user-exoskeleton human-machine system.

In the desired angular accelerations calculation unit 46 the vector of desired angular accelerations are calculated based on the vector of desired acceleration for motion along the trajectory in the Cartesian coordinate system and vector of desired angles and angular velocities.

Vector $\ddot{Y}^*(t)$ is used for calculation of the vector of desired angular accelerations $\ddot{\vartheta}^*(t)$. For that, by differentiating the formula and inserting the vector $\ddot{Y}^*(t)$ and vectors $Y^*(t)=\Xi(t)$, $\dot{Y}^*(t)=\dot{\Xi}(t)$, in it we calculate the vector components $\ddot{\vartheta}^*(t)$.

Obtained expressions for the desired second derivatives as per angles $\ddot{\vartheta}^*(t)$ are formed taking into account possible deviations of the exoskeleton from the desired trajectories in the Cartesian coordinates.

In the unit 48 the vector of desired angular accelerations to the drives are calculated based on the previously calculated vector of desired angular accelerations, vector of desired angles and angular velocities, vector of current values of angles and angular velocities in pivot joints, Next level of algorithm formation ensuring improvement of the drive system control quality, consists in calculation of the vector components of angular acceleration $\ddot{\vartheta}(t)$ for their working off by the drive system, which is formed taking into account possible errors occurring during exoskeleton drive system operation $$\ddot{\vartheta}(t)=(\mu_1+\mu_2)(\dot{\vartheta}(t)-\dot{\vartheta}^*(t))-\mu_1\mu_2(\vartheta(t)-\vartheta^*(t))+\ddot{\vartheta}^*(t), \quad (9)$$

where $\mu_1, \mu_2<0$—vectors of control parameters the values of which are determined by the drive dynamics. It allows provision of the smooth exoskeleton motion along the desired trajectories and increases the accuracy of the motion implementation.

In the unit 71 evaluation of the body angular motion is conducted. Operator body is the weightiest object which certainly requires consideration of its motion. In the present embodiment of method for control the operator $\psi$ body angular motion is evaluated based on the formula (V. V. Beletskiy. Biped walking. Model tasks of dynamics and control. Moscow: Nauka, 1984. 268 pages, Page 65, V. V. Beletskiy, E. K. Lavrovskiy Model task of biped walking./ Solid body mechanics, No. 2, 1981. Page 25)

$$\psi(t) = -\frac{ML}{2K_r}\left[ch\omega t - \frac{1+ch\omega T_{step}}{sh\omega T_{step}}sh\omega t\right] - \frac{Mx_{pel}}{K_r}, \quad (10)$$

-continued $$\omega^2 = \frac{K_r g}{J + K_r h}, K_r = m_t r.$$

where $m_t$—trunk weight;
J—trunk moment of inertia;
r—distance from the trunk mass center to the pelvis;
M—weight of the user's body;
L—step length;
h—height of pelvis point movement;
$T_{step}$—step period,
from where the first and second derivatives of this angle can be obtained. Evaluation $\psi$ of angle and its derivatives is used for evaluation of external moment which is mainly created due to the operator body oscillations.

In the external moment evaluation unit 40 the vector of external moment is calculated based on the previously calculated vectors of desired angular accelerations to the drives, vector of current values of angles and angular velocities in pivot joints and measured vector of the exoskeleton drives currents,
For provision of the smooth exoskeleton motion it is necessary to take into account the equations of dynamics together with evaluation of oscillating body movements. Exoskeleton drive system can be a hydro drive, pneumatic drive or electric drive.

It is known [V. V. Titov, I. V. Shardyko, I. Yu. Dalyaev. Implementation of force-torque control for two-stage manipulator./Visnik NTUU "KPI". Series of machine equipment No. 2 (68). 2013. Page 150] that the electric drive dynamics is described by the equations $$\begin{cases} \tau_m(t) = C_m \cdot i_m(t); \\ e(t) = C_e \cdot \dot{\alpha}; \\ u(t) = e(t) + R_m \cdot i_m(t) + \frac{di_m(t)}{dt} \cdot L_m; \\ J_m \cdot \ddot{\alpha} = \tau_m(t) - \tau_{mext}(t) - \tau_{fric}(\dot{\alpha}, \tau_m - \tau_{mext}, \tau); \end{cases}$$

Where $T_m$—motor moment, $C_m$, $C_e$—moment and electric constant of the motor respectively, e—motor back electromotive force, $R_m$, $L_m$=motor resistance and armature inductance, $J_m$—motor rotor moment of inertia, $\tau_{mext}$—external moment on the motor shaft, $\ddot{a}$, $\dot{a}$—acceleration and angular rotation rate of the motor shaft a, $\tau_{fric}$—force of friction on the motor shaft, u—feed voltage on the motor windings.
On the other side, in case of electric drive the vector of external, in relation to the drive, moments obtained from the dynamics equation has the form of $$\tau_e = -W^{-1}[D(\theta)\ddot{\tilde{\theta}} + H(\theta,\dot{\theta}) + G(\theta) + R(\theta)] - \tau_h(t), \quad (11)$$

where $\ddot{\tilde{\theta}} = [\ddot{Y}^*, \ddot{\psi}, \ddot{\tilde{\theta}}]$, can be found using evaluations taking into account mass-inertial [A. V. Voronov. Anatomical organization and biomechanical characteristics of muscles and joints of a lower extremity./Moscow: Moscow, Fizkultura, obrazovanie i nauka, 2003, Pages 11-12, 19-20; D. A. Winter, Biomechanics and motor control of human movement, 2005. JOHN WILEY & SONS, INC., P. 86, Table 4.1] characteristics of the mechanical system—a person in exoskeleton, as well as based on the consideration of the drives dynamics and current vectors measurement going on in electromechanical drives. As a result $$M_{dv}(t) = (\tau_{fric} + J_e \cdot T\ddot{\tilde{\theta}}(t)) \cdot j + W^{-1}[D(\theta)\ddot{\tilde{\theta}} + H(\theta,\dot{\theta}) + G(\theta) + R(\theta)] \quad (12)$$

Here $M_{dv}$—moment developed by the motor at the reduction gear output shaft, $C_m$, $J_e$—electric motors parameters matrices, j—reduction coefficient matrix, i—current vector, T[7×4]—vector translation matrix $\theta$ to the vector of the exoskeleton intersection angles, $\tau_{fric}$—friction forces moment driven to the motors output shaft.

In the control signals generation unit 52 the vector of control signals to the exoskeleton drives is calculated and generated based on the previously calculated vector of current angles, evaluated external moment vector and measured vector of current angles and angular velocities value in the pivot joints, as well as exoskeleton drives current vector. Control voltage in case of electric drives is calculated as follows $$u(t) = C_e \cdot T \cdot \dot{\theta} + C_m^{-1} R_e M_{dv} / j + \frac{di(t)}{dt} \cdot L_e \quad (13)$$

Similarly the control is organized for the drives of other types.

The above formulas are used to develop algorithms for generation of the desired trajectories of motion in the Cartesian coordinate system and the control signals to the exoskeleton drives and are implemented in software in the exoskeleton on-board controller.

Thus, through significant differences of this invention from the prior art:
  possibility is provided for assistance to the walking of users both with partial and complete loss of musculoskeletal disorder, wherein user motion is conducted according to the set by the exoskeleton walking pattern of a person without a musculoskeletal disorder with kinematic characteristics (ratio of shank length to thigh length) close to the user kinematic characteristics;
  possibility is provided for recovery of the correct walking pattern of the user with the possibility to change using control panel such walking parameters as stride length, step height and pace;
  possibility is provided of various user motion modes on horizontal, inclined and stepped surfaces, as well as crossing over of obstacles and walking on the spot through setting the exoskeleton for motion along the desired trajectories corresponding to the motion on the selected surface;
  through setting of desired angular accelerations according to exponential second-order model with negative actual control parameters the possibility is provided of smooth and smooth motion along the desired trajectories of hip and ankle pivots set in the Cartesian coordinates.

The above results confirm the achievement in this invention of technical results in relation of enhancement of functional capabilities and improvement of ergonomic characteristics of the device.

Patent research conducted by the applicant showed that there are no analogues to the present significant differences.

What is claimed is:
1. Method for setting desired trajectories of movement of an exoskeleton in the Cartesian coordinate system for movement in a sagittal plane in a pre-determined in advance motion mode of a user with a musculoskeletal disorder using an exoskeleton, the exoskeleton comprising
    a pelvic section,
    left and right foot rests each of which consists of
        a thigh section,
        a shank section and a foot section,
  wherein adjacent sections of the pelvic section, the thigh section, the shank section and the foot sections are connected using corresponding pivot joints, including hip, knee and ankle joints, permitting their rotation in the sagittal plane,
  sensors of relative angle rotation of the adjacent sections connected with corresponding pivot joints,
  electric drives with control inputs connected to the corresponding hip joint and knee joint,
an on-board controller connected with the sensors of relative angle rotation of the adjacent sections and the control inputs of the electric drives;
wherein the method is executed by a desired motion Cartesian trajectories parameters determination system which comprises:
  a motion capture system comprising serially connected
    a measuring devices unit,
    a captured motion parameters data processing unit,
    a captured motion parameters storage unit;
  a captured motion parameters processing unit connected to the motion capture system,
  a storage unit of an exoskeleton desired motion trajectories parameters and/or interpolation coefficients in the Cartesian coordinate system connected to the captured motion parameters processing unit,
the method comprising:
measuring Cartesian coordinates of pre-selected human body points of a person without a musculoskeletal disorder in the process of its motion using the motion capture system,
  the pre-selected human body points of the person being a point of intersection of a hip joint axis, lying in a frontal plane, with a sagittal plane and points of intersection of ankle joint axes, lying in the frontal plane, with the sagittal plane;
said Cartesian coordinates are measured depending on time in the form of trajectories along the axes of the Cartesian coordinates system of the above sagittal plane during motion of the above person for each pre-determined in advance motion mode,
said Cartesian coordinates are saved in the captured motion parameters storage unit in the form of data arrays for each measured trajectory,
  wherein an axis of ordinates of the above coordinates system of the sagittal plane is directed vertically, and an axis of abscissas is directed along the course of exoskeleton motion,
processing, in the captured motion parameters processing unit, parameters and/or interpolation coefficients of the captured motion,
calculating, based on the data arrays of the time functions of the Cartesian coordinates, the parameters and/or interpolation coefficients for each of an interpolating function of the trajectories, differentiated at least twice,
  wherein the calculated parameters and/or interpolation coefficients are saved in the storage unit of the exoskeleton desired motion trajectories parameters and/or interpolation coefficients in the Cartesian coordinate system,
wherein the above measurements, processing of data obtained as a result of these measurements and storage of these data processing results are conducted for groups of people with various ratios of shank length to thigh length, wherein the data on the above ratios and shank length for each person in this group is preserved.

2. Method according to claim 1, characterized in that the pre-determined in advance motion modes of a person without a musculoskeletal disorder are the modes: "Walking on a horizontal surface", "Climbing a stair", "Descending a stair", "Walking up an inclined surface", "Walking down the inclined surface", "Crossing over an obstacle", "Sitting on a rest", "Standing vertically with straightened legs", "Standing up vertically with straightened legs from the "Sitting on a rest" position", "Sitting down on a rest from the "Standing vertically with straightened legs" position".

3. Walking assistance device for a user with a musculoskeletal disorder in predetermined modes of movement, comprising:
  an exoskeleton of lower limbs, comprising:
    a pelvic section,
    left and right foot rests, each of which includes:
      a thigh section,
      a shank section, and
      a foot section,
      wherein adjacent pelvic, thigh, shank and foot sections are connected using corresponding pivot joints, including hip, knee and ankle joints, their rotation in a sagittal plane,
      first, second, third and fourth electric drives connected to the corresponding hip and knee joints, wherein each one of the first, second, third and fourth electric drives comprises a control input,
    an on-board controller;
  left and right hand rests;
  a unit of desired trajectories generation in a Cartesian coordinates system configured to input to it and store in it time-dependent parameters and/or interpolation coefficients of desired motion trajectories in the Cartesian coordinates system for pre-determined in advance motion modes,
    wherein the unit of desired trajectories generation in the Cartesian coordinates system comprises a first input, a second input, a third input, a fourth input, a first output and a second output;
  a control panel configured to select the motion mode and adjust motion parameters,
    wherein an output of the control panel is connected to the first input of the unit of desired trajectories generation in a Cartesian coordinates system;
  a desired motion Cartesian trajectories parameters determination system, an input of which is configured to be connected to the second output of the unit of desired trajectories generation in a Cartesian coordinates system, and an output of which is configured to be connected to the third input of the unit of desired trajectories generation in a Cartesian coordinates system;
  a control device comprising:
    a first input connected to the first output of the unit of desired trajectories generation in a Cartesian coordinates system,
    a second input, a third input, a fourth input and an output connected to the control inputs of the first, second, third and fourth electric drives;
    the control device comprising:
      a desired exoskeleton angles and angular velocity calculation unit comprising an input connected to the first input of the control device, and an output, a current exoskeleton Cartesian coordinates vector calculation unit comprising an input connected to the third input of the control device, and an output, a desired motion acceleration generation unit comprising a first input connected to the first input of the control device, a second input connected to the output of the current exoskeleton Cartesian coordinates vector calculation unit, and an output;

a desired angular acceleration calculation unit comprising a first input connected to the output of the desired motion acceleration generation unit, a second input connected to the output of the desired exoskeleton angles and angular velocities calculation unit, and an output;

an exoskeleton drives desired angular acceleration calculation unit comprising a first input connected to the output of the desired angular acceleration calculation unit, a second input connected to the output of the desired exoskeleton angles and angular velocity calculation unit, a third input is connected to the third input of the control device, and an output;

a user torso angular motion evaluation unit comprising an input connected to the output of the current exoskeleton Cartesian coordinates vector calculation unit, and an output;

an external moment evaluation unit comprising:
a first input connected to the output of the exoskeleton drives desired angular acceleration calculation unit,
a second input connected to the third input of the control device,
a third input is connected to the fourth input of the control device,
a fourth input connected to the output of the user torso angular motion evaluation unit,
a fifth input connected to the second input of the control device, and an output;

an exoskeleton drives control signal generation unit-comprising:
a first input connected to the output of the external moment evaluation unit, a second input connected to the third input of the control device,
a third input connected to the output of the exoskeleton drives desired angular acceleration calculation unit,
a fourth input connected to the fourth input of the control device, and an output connected to the output of the control device;

a foot rest reaction measurement unit comprising foot rest reaction sensors mounted in a heel and toe-cap of the foot section, wherein an output of the foot rest reaction measurement unit is connected to the second input of the unit of desired trajectories generation in the Cartesian coordinates system and to the second input of the control device;

a current angles and angular velocities measurement unit comprising sensors of relative angle rotation connected with the corresponding pivot joints, wherein an output of the current angles and angular velocities measurement unit is connected to the third input of the control device;

an electric drives current measurement unit comprising first, second, third, and fourth current sensors of, respectively, first, second, third, and fourth electric drives, wherein an output of the electric drives current measurement unit is connected to the fourth input of the control device, an external computer of an assistant-specialist configured to input into the exoskeleton on-board controller a ratio of shank length to thigh length, a shank length, mass and inertial properties of user body segments with the exoskeleton attached thereto, a motion mode selection and adjustment of the motion parameters, wherein an output of the external computer of an assistant-specialist is configured to be connected to the fourth input of the unit of desired trajectories generation in the Cartesian coordinates system;

wherein the on-onboard controller is connected to the sensors of relative angle rotation of the adjacent sections and to the control inputs of the electric drives.

4. Device according to claim 3, characterized in that the desired Cartesian trajectories generation unit and the control device are implemented in software in the on-board controller of the exoskeleton.

5. Device according to claim 3, characterized in that the pre-determined in advance motion modes of the exoskeleton are the modes: "Walking on a horizontal surface", "Climbing a stair", "Descending a stair", "Walking up an inclined surface", "Walking down the inclined surface", "Crossing over an obstacle", "Sitting on a rest", "Standing vertically with straightened legs", "Standing up vertically with straightened legs from the "Sitting on a rest" position", "Sitting down on a rest from the "Standing vertically with straightened legs" position".

6. Method of controlling a walking assistance device for a user with a musculoskeletal disorder in predetermined modes of movement using an exoskeleton for lower limbs of the user, the exoskeleton comprising a pelvic section,
left and right foot rests, each of which consists of
a thigh section,
a shank section, and
a foot section,
wherein adjacent sections of the pelvic section, the thigh section, the shank section and the foot section are connected using corresponding pivot joints, including hip, knee and ankle joints, permitting their rotation in a sagittal plane,
electric drives comprising first, second, third and fourth electric drives connected to the corresponding hip and knee joints, wherein each of the first, second, third and fourth electric drives comprises a control input;
an on-board controller;
left and right hand rests;
a unit of desired trajectories generation in the Cartesian coordinates system comprising a first input, a second input, a third input, a fourth input, a first output and a second output;
a control panel having an output connected to the first input of the unit of desired trajectories generation in the Cartesian coordinates system;
a desired motion Cartesian trajectories parameters determination system having an input configured to be connected to the second output of the unit of desired trajectories generation in the Cartesian coordinates system, and an output configured to be connected to the third input of the unit of desired trajectories generation in the Cartesian coordinates system;
a control device comprising a first input connected to the first output of the unit of desired trajectories generation in the Cartesian coordinates system, a second input, a third input, a fourth input, and an output connected to the electric drives control inputs, the control device comprising:

a desired exoskeleton angles and angular velocity calculation unit having an input connected to the first input of the control device, and an output;

a current exoskeleton Cartesian coordinates vector calculation unit having an input connected to the third input of the control device, and an output;

a desired motion acceleration generation unit, having a first input connected to the first input of the control device, a second input connected to the output of the current exoskeleton Cartesian coordinates vector calculation unit, and an output;

a desired angular acceleration calculation unit having a first input connected to the output of the desired motion acceleration generation unit, and a second input connected to the output of the desired exoskeleton angles and angular velocities calculation unit, and an output;

an exoskeleton drives desired angular acceleration calculation unit having a first input connected to the output of the desired angular acceleration calculation unit, a second input connected to the output of the desired exoskeleton angles and angular velocity calculation unit, a third input connected to the third input of the control device, and an output;

a user torso angular motion evaluation unit having an input connected to the output of the current exoskeleton Cartesian coordinates vector calculation unit, and an output;

an external moment evaluation unit having a first input connected to the output of the exoskeleton drives desired angular acceleration calculation unit, a second input connected to the third input of the control device, a third input connected to the fourth input of the control device, a fourth input connected to the output of the user torso angular motion evaluation unit, a fifth input connected to the second input of the control device, and an output;

an exoskeleton drives control signal generation unit having a first input connected to the output of the external moment evaluation unit, a second input connected to the third input of the control device, a third input connected to the output of the exoskeleton drives desired angular acceleration calculation unit, a fourth input connected to the fourth input of the control device, and an output connected to the output of the control device;

a foot rest reaction measurement unit comprising foot rest reaction sensors mounted in a heel and toe-cap of each foot section, wherein an output of the foot rest reaction measurement unit is connected to the second input of the unit of desired trajectories generation in the Cartesian coordinate system and to the second input of the control device;

a current angles and angular velocities measurement unit comprising sensors of relative angle rotation connected with corresponding pivot joints, wherein an output of the current angles and angular velocities measurement unit is connected to the third input of the control device;

an electric drives current measurement unit comprising first, second, third, and fourth current sensors of, respectively, first, second, third, and fourth electric drives, wherein an output of the electric drives current measurement unit is connected to the fourth input of the control device;

an external computer of an assistant-specialist having an output configured to be connected to the fourth input of the unit of desired trajectories generation in the Cartesian coordinates system;

wherein the method comprises:

measuring current angles and angular velocities in the hip and knee joints and reaction forces of the left and right foot rests;

measuring user parameters including a ratio of shank length to thigh length, shank length, and mass and inertial properties of user body segments, wherein the mass and inertial properties are measured directly or indirectly with the pelvic, thigh, shank and foot sections attached to them;

inputting, using the external computer of the assistant-specialist, the measured user parameters into the unit of desired trajectories generation in the Cartesian coordinate system;

inputting, from the unit of desired trajectories generation in the Cartesian coordinates, the measured user parameters into the desired motion Cartesian trajectories parameters determination system;

obtaining, from the desired motion Cartesian trajectories parameters determination system, data corresponding to a specified ratio of shank length to thigh length of the user, inputting into the unit of desired trajectories generation in the Cartesian coordinates system in the form of arrays of parameters and/or coefficients of interpolation of interpolating functions obtained for a person without a musculoskeletal disorder during his/her movement in each of the pre-determined modes of movement;

setting a motion mode from the series of pre-determined modes of movement using the external computer of the assistant-specialist or the control panel;

calculating numeric values of interpolating functions and scaling by way of their multiplication by a coefficient equal to the ratio between the shank length of the user with a musculoskeletal disorder and the shank length of a person without a musculoskeletal disorder;

setting desired step parameters from the control panel or the external computer of the assistant-specialist, scaling the interpolating functions corresponding to the user represented in the Cartesian coordinate system by corresponding coefficients, as well as scaling a time axis of the interpolating functions for changing pace, wherein the scaling is conducted for each particular coordinate and for their combinations;

calculating, in the current exoskeleton Cartesian coordinates vector calculation unit, a vector of the current exoskeleton Cartesian coordinates, based on the obtained measurements of angles and angular velocities in the hip and knee joints;

generating, in the unit of desired trajectories generation in the Cartesian coordinates system, desired trajectories of the hip and ankle joints of the exoskeleton dependent on time, by calculating based on stored time-dependent arrays of parameters and/or coefficients of interpolation of interpolating functions recorded in the Cartesian coordinate system;

calculating, a vector of the desired angles and angle velocities based on a previously calculated values of the vector of the desired trajectories and their first derivatives;

calculating, in the desired motion acceleration generation unit, a vector of desired acceleration for motion along the trajectory in the Cartesian coordinate system based on the previously calculated values of the position and velocity in the Cartesian coordinate system and the vector of desired trajectories and their first and second derivatives;

calculating, in the desired angular acceleration calculation unit, a vector of desired angular acceleration based on a vector of desired acceleration for motion along the trajectory in the Cartesian coordinate system and vector of desired angles and angular velocities;

calculating, in the exoskeleton drives desired angular acceleration calculation unit, a vector of desired angular acceleration to the exoskeleton drives, based on a previously calculated vector of desired angular velocities, vector of desired angles and angular velocities, vector of current angles and angular velocities value in the pivot joints;

calculating, in the external moment evaluation unit, a vector of external moment-based on previously calculated vector of desired angular accelerations to the electric drives, a vector of current angles and angular acceleration values in the pivot joints, a vector of foot rest reaction, a measured vector of exoskeleton drives currents and taking into account mass and inertial properties of the user body segments with the exoskeleton put on; and calculating and generating a vector of control signals to the electric drives of the exoskeleton, in the exoskeleton drives control signal generation unit, based on the previously calculated vector of current angles values, the external moment vector and the measured vector of current angles and angular velocities values in the pivot joints, and vectors of the exoskeleton drives currents.

7. Method according to claim 6, characterized in that the pre-determined modes of movement of the exoskeleton are the modes: "Walking on a horizontal surface", "Climbing a stair", "Descending a stair", "Walking up an inclined surface", "Walking down the inclined surface", "Crossing over an obstacle", "Sitting on a rest", "Standing vertically with straightened legs", "Standing up vertically with straightened legs from the "Sitting on a rest" position", "Sitting down on a rest from the "Standing vertically with straightened legs" position".

8. Method according to claim 6, characterized in that the unit of desired motion trajectories generation in the Cartesian coordinate system and control device are implemented in software in the on-board controller of the exoskeleton.

* * * * *